US012001733B2

(12) United States Patent
Kikuchi

(10) Patent No.: US 12,001,733 B2
(45) Date of Patent: Jun. 4, 2024

(54) INFORMATION PROCESSING APPARATUS, METHOD OF CONTROLLING INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hiroshi Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/053,117

(22) Filed: Nov. 7, 2022

(65) Prior Publication Data

US 2023/0145977 A1    May 11, 2023

(30) Foreign Application Priority Data

Nov. 10, 2021 (JP) .................................. 2021-183249
Sep. 7, 2022 (JP) .................................. 2022-142195

(51) Int. Cl.
*G06F 3/12* (2006.01)
*H04L 12/46* (2006.01)

(52) U.S. Cl.
CPC .......... *G06F 3/1224* (2013.01); *G06F 3/1203* (2013.01); *G06F 3/1286* (2013.01); *G06F 3/1288* (2013.01); *H04L 12/4641* (2013.01)

(58) Field of Classification Search
CPC . H04L 12/4641; G06F 3/1286; G06F 3/1288; G06F 3/1224; G06F 3/1203
See application file for complete search history.

(56) References Cited

U.S. PATENT DOCUMENTS

| 11,474,767 | B1* | 10/2022 | Sait ...................... G06F 3/1268 |
| 2008/0158597 | A1 | 7/2008 | Hashimoto et al. |
| 2010/0328720 | A1 | 12/2010 | Suzuki |
| 2012/0212759 | A1* | 8/2012 | Murata ................ G06F 3/1226 |
| | | | 358/1.15 |

(Continued)

FOREIGN PATENT DOCUMENTS

JP    2017084016 A    5/2017
JP    2020161157 A    10/2020

OTHER PUBLICATIONS

Extended European Search Report for Application No. 22204045.3, European Patent Office, dated Apr. 6, 2023.

*Primary Examiner* — John R Wallace
(74) *Attorney, Agent, or Firm* — Canon U.S.A., Inc. IP Division

(57) ABSTRACT

According to an aspect of the present disclosure, an information processing apparatus comprises: a storage device configured to store a first network address used when connected to a first printer and a second network address used when connected to a second printer; one or more memories; and one or more processors that are configured to cooperate with the one or more memories to control the information processing apparatus to control, when communicable with the first and second printers: displaying the first printer as a candidate of destination of print data, the first printer being accessible using the first network address; and not displaying the second printer as a candidate of destination of the print data, the second printer being inaccessible using the first network address.

21 Claims, 20 Drawing Sheets

(56) References Cited

U.S. PATENT DOCUMENTS

| | | | |
|---|---|---|---|
| 2013/0094045 A1* | 4/2013 | Nakata | G06F 3/126 358/1.13 |
| 2020/0084334 A1* | 3/2020 | Tatsuma | G06F 3/067 |
| 2022/0300225 A1* | 9/2022 | Oshima | G06F 3/1286 |

* cited by examiner

FIG. 3
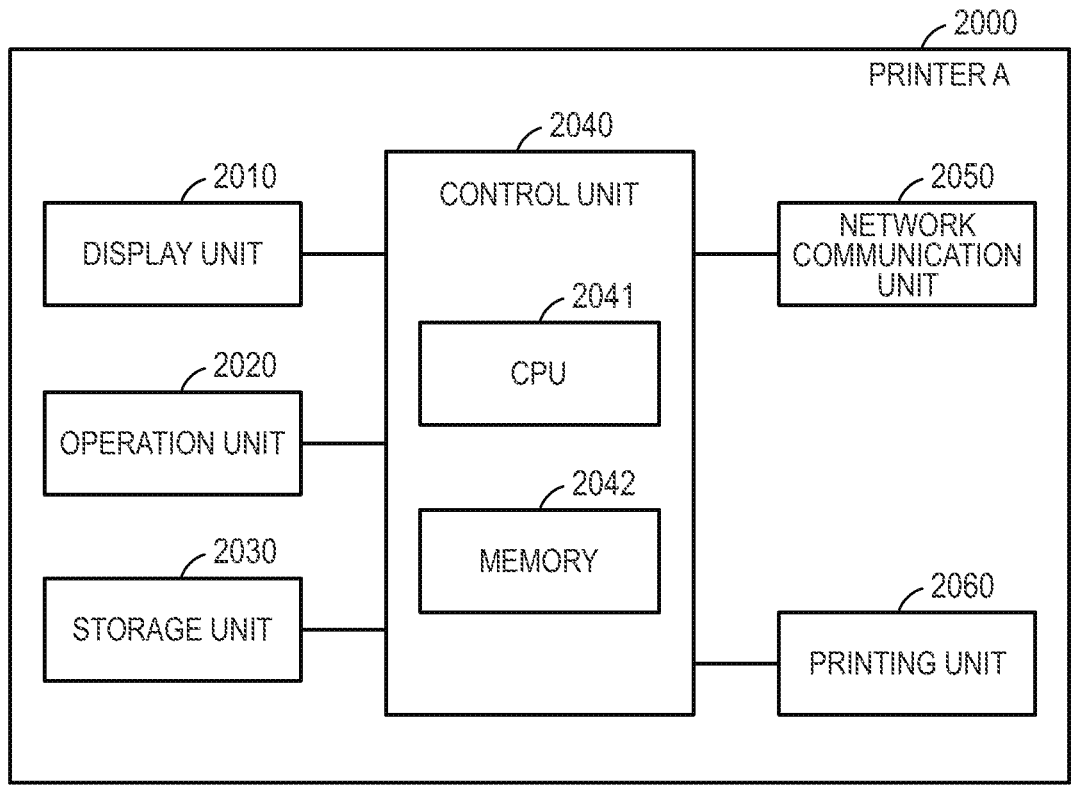
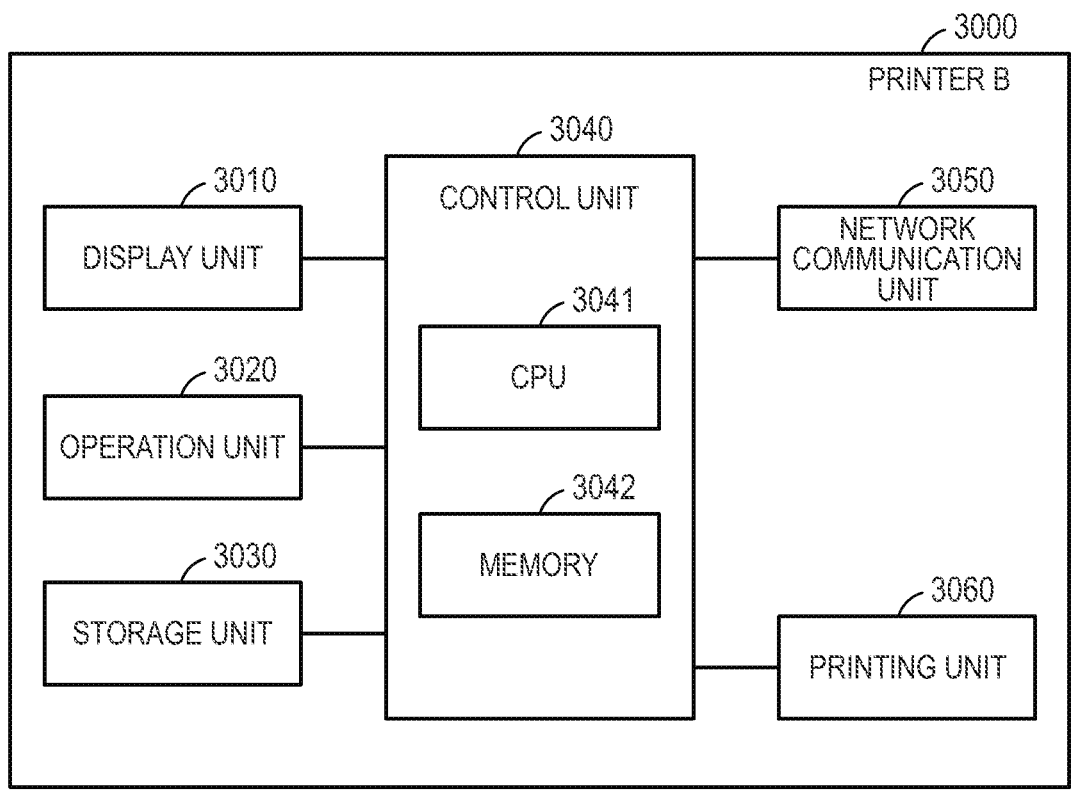

FIG. 6

| SETTING | — □ × |

PRINTER

1700 —— ☐ DO NOT USE PRINTERS THAT ARE NOT INSTALLED
IN THE PRESENT LOCATION

IF THIS SETTING IS SELECTED, PRINTERS THAT ARE NOT INSTALLED
IN THE PRESENT LOCATION ARE NOT USED.
THIS SETTING ALLOWS TO AVOID USING PRINTERS INSTALLED
DISTANTLY FROM HERE.

FIG. 7

| NETWORK | COMPUTER | | PRINTER A | PRINTER B |
|---|---|---|---|---|
| | HOME NETWORK | VIRTUAL PRIVATE NETWORK | HOME NETWORK | COMPANY NETWORK |
| IP ADDRESS | 192.168.1.50 | 10.152.51.20 | 192.168.1.46 | 172.26.178.127 |
| SUBNET MASK | 255.255.255.0 | 255.255.255.255 | 255.255.255.0 | 255.255.248.0 |

FIG. 13

```
>ipconfig
IP CONFIGURATION
 NETWORK ADAPTER A:
    IPv4 ADDRESS··············10.152.51.20
    SUBNET MASK··············255.255.255.255

NETWORK ADAPTER B:
    IPv4 ADDRESS··············192.168.1.50
    SUBNET MASK··············255.255.255.0
```

```
>ping 192.168.1.46
>ping 172.26.178.127
```

FIG. 14B

```
>ping /S 192.168.1.50 192.168.1.46
>ping /S 192.168.1.50 172.26.178.127
```

FIG. 14C

```
>ping /S 10.152.51.20 192.168.1.46
>ping /S 10.152.51.20 172.26.178.127
```

FIG. 15

IPv4 ROUTING TABLE

ACTIVE ROUTE:

| NETWORK DESTINATION | SUBNET MASK | GATEWAY | INTERFACE | METRIC |
|---|---|---|---|---|
| 0.0.0.0 | 0.0.0.0 | 192.168.1.1 | 192.168.1.50 | 25 |
| 10.0.0.0 | 255.0.0.0 | ON-LINK | 10.152.51.20 | 1 |
| 10.152.51.20 | 255.255.255.255 | ON-LINK | 10.152.51.20 | 257 |
| 10.255.255.255 | 255.255.255.255 | ON-LINK | 10.152.51.20 | 257 |
| 172.16.0.0 | 255.240.0.0 | ON-LINK | 10.152.51.20 | 1 |
| 192.168.0.0 | 255.255.0.0 | ON-LINK | 10.152.51.20 | 1 |
| 192.168.1.0 | 255.255.255.0 | ON-LINK | 192.168.1.50 | 281 |
| 192.168.1.50 | 255.255.255.255 | ON-LINK | 192.168.1.50 | 281 |

FIG. 20

SETTING

ADD VPN CONNECTION

CONNECTION NAME

[ ] — 2001

SERVER NAME OR ADDRESS

[ ] — 2002

TYPE OF VPN

[ ] — 2003

PRE-SHARED KEY

[ ] — 2004

USER NAME

[ ] — 2005

PASSWORD

[ ] — 2006

[ SAVE ] — 2007

INFORMATION PROCESSING APPARATUS, METHOD OF CONTROLLING INFORMATION PROCESSING APPARATUS, AND NON-TRANSITORY COMPUTER-READABLE STORAGE MEDIUM

BACKGROUND

Field

The present disclosure relates to an information processing apparatus, a method of controlling an information processing apparatus, and a non-transitory computer-readable storage medium.

Description of the Related Art

In recent years, with the expansion of telework, there has been an increase in a working style (so-called home teleworking) where people work in their home. As a style of home teleworking, there is a style in which a computer (hereinafter referred to as "PC"), such as a laptop PC used in a company (office), is brought home, and the PC is connected to a home network for work. In this case, connecting a company (office) network to the home network via a virtual private network (VPN) allows a user to access the company network securely even from the user's home.

When performing a printing operation in home teleworking, a user may install a printer driver for a printer connected to the home network in the PC to perform the printing operation using the home printer. In this case, the PC brought back from the office (company) can perform a printing operation using both the office printer and the home printer. In such a situation, if the user performs the printing operation using the office printer that is mistakenly selected while working at home, an error occurs if the user (PC) is not connected to the VPN. On the other hand, if the user (PC) is connected to the VPN, printing data is output from the office printer but the user cannot take the printed data, which causes a risk of leaking information.

Japanese Patent Application Laid-Open No. 2017-84016 discloses a technique for preventing a print instruction to a printer not intended by a user, and the prevention is achieved by obtaining and verifying, upon receiving the print instruction, an address of a relay device relaying the instruction to a target printer.

According to the technique disclosed in Japanese Patent Application Laid-Open No. 2017-84016, however, it is necessary to reselect a printer to be used if an unintended printer is selected, which is not convenient for the user.

In a case where a company PC is brought home for use, it takes time to find the desired home printer because the company printer and home printer are listed indistinguishably. In addition, if a user mistakenly selects a company printer, the user may have errors or a risk of leaking information. As described above, in a case of using a company PC at home, there is a problem of low usability when a user selects a printer to be used for printing from a printer list.

SUMMARY

According to an aspect of the present disclosure, an information processing apparatus comprises: a storage device configured to store a first network address used when connected to a first printer and a second network address used when connected to a second printer; one or more memories; and one or more processors that are configured to cooperate with the one or more memories to control the information processing apparatus to control, when communicable with the first and second printers: displaying the first printer as a candidate of destination of print data, the first printer being accessible using the first network address; and not displaying the second printer as a candidate of destination of the print data, the second printer being inaccessible using the first network address.

Further features of various embodiments will become apparent from the following description of exemplary embodiments with reference to the attached drawings.

BRIEF DESCRIPTION OF THE DRAWINGS

FIG. 3 is a block diagram showing the hardware configuration of the printer.

FIG. 6 shows a UI for setting up to exclude unintended printers from options.

FIG. 7 shows IP addresses on each network of computers and printers.

FIG. 13 shows an example of a result of executing the "ipconfig" command.

FIG. 14A shows an example of executing the "ping" command.

FIG. 14B shows an example of executing the "ping" command.

FIG. 14C shows an example of executing the "ping" command.

FIG. 15 shows a routing table obtained by the "route print" command.

FIG. 20 shows an example of a setting screen for VPN connection.

DESCRIPTION OF THE EMBODIMENTS

The embodiments of the present disclosure will now be described with reference to the drawings.

First Embodiment

Figure 1:
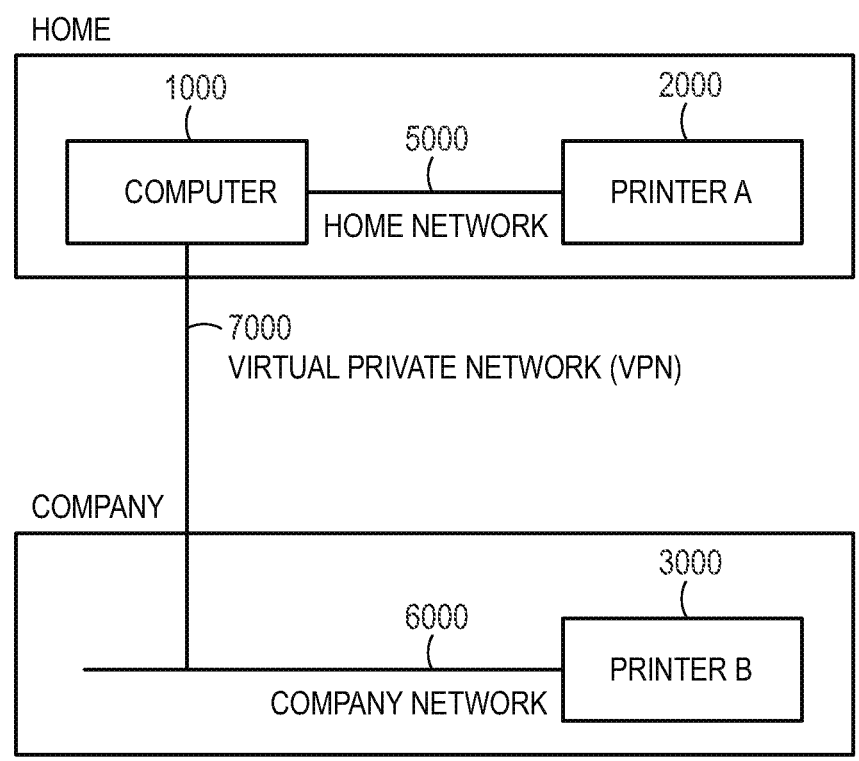
FIG. 1 shows the network configuration including an information processing apparatus according to the first embodiment.

FIG. 1 is a diagram showing an example of a network configuration including an information processing apparatus according to the first embodiment of the present disclosure.

A computer 1000 and a printer A2000 are arranged at home, and are connected to each other via a home network 5000. The home network 5000 is connected to the outside Internet via a router (not shown).

A company (office) has a printer B3000 that is connected to a company network 6000. It is considered here that the company network 6000 is also connected to the outside Internet via a router and a VPN server (not shown).

Furthermore, the computer 1000 is virtually connected to the company network 6000 via a virtual private network (VPN) 7000. Thus, the computer 1000 can safely access the data of the company network 6000 via the Internet (not shown).

The computer 1000 can activate/deactivate the connection to the virtual private network 7000 according to user's selection. The home network 5000 and the company network 6000 may each be a wired network or a wireless network.

Figure 2:
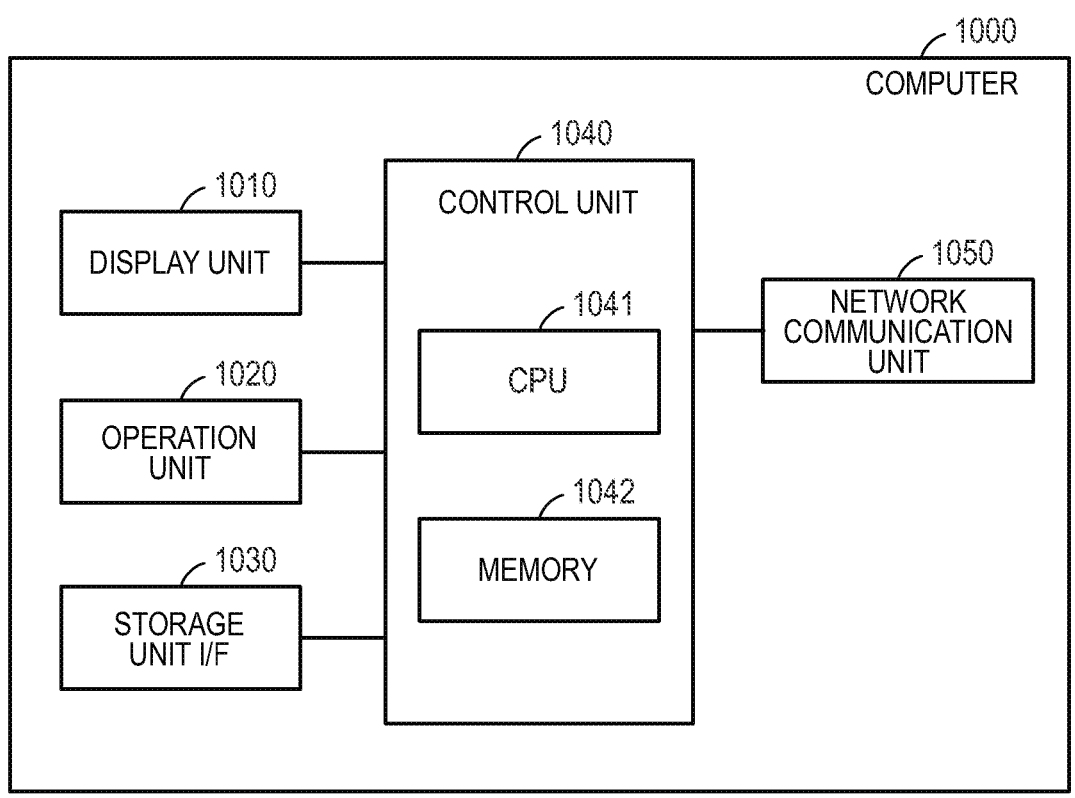
FIG. 2 is a block diagram showing the hardware configuration of the computer.

FIG. 2 is a block diagram showing an example of a hardware configuration of the computer 1000.

In the computer 1000, a control unit 1040 having a CPU 1041 and a memory 1042 controls the whole. A display unit 1010 is an output device, such as a display device. An operation unit 1020 is an input device, such as a mouse or a keyboard.

A storage unit 1030 is a storage device, such as a hard disk drive (HDD) or a solid state drive (SSD), and stores various software necessary for operating the computer 1000. The software is loaded into the memory 1042 as needed and executed by the CPU 1041.

A network communication unit 1050 is connected to an external network to input/output data from/to an external device.

The processing in the present embodiment is realized by at least one CPU 1041 loading the software stored in the storage unit 1030 into the memory 1042 included in the control unit 1040 and executing the software. CPU refers to a Central Processing Unit.

FIG. 3 is a block diagram showing a hardware configuration of a printer A2000 and a printer B3000.

In the printer A2000, a control unit 2040 including a CPU 2041 and a memory 2042 controls the whole. A display unit 2010 is an output device, such as a liquid crystal panel. An operation unit 2020 is an input device, such as a touch panel and various buttons.

A storage unit 2030 is a storage device, such as an HDD or an SSD, and stores various kinds of software required for the operation of the printer A2000. The software is loaded into the memory 2042 as needed and executed by the CPU 2041.

A network communication unit 2050 is connected to an external network to input/output data from/to an external device.

A printing unit 2060 images digital data stored in the storage unit 2030 or the memory 2042 according to instructions by the control unit 2040 and prints out an image on a physical sheet. The printing method may be an ink-jet method, a toner method, or another method.

The configurations of the printer B3000 are same as the printer A2000. The descriptions about the configurations of the printer B3000 will be omitted.

Figure 4:
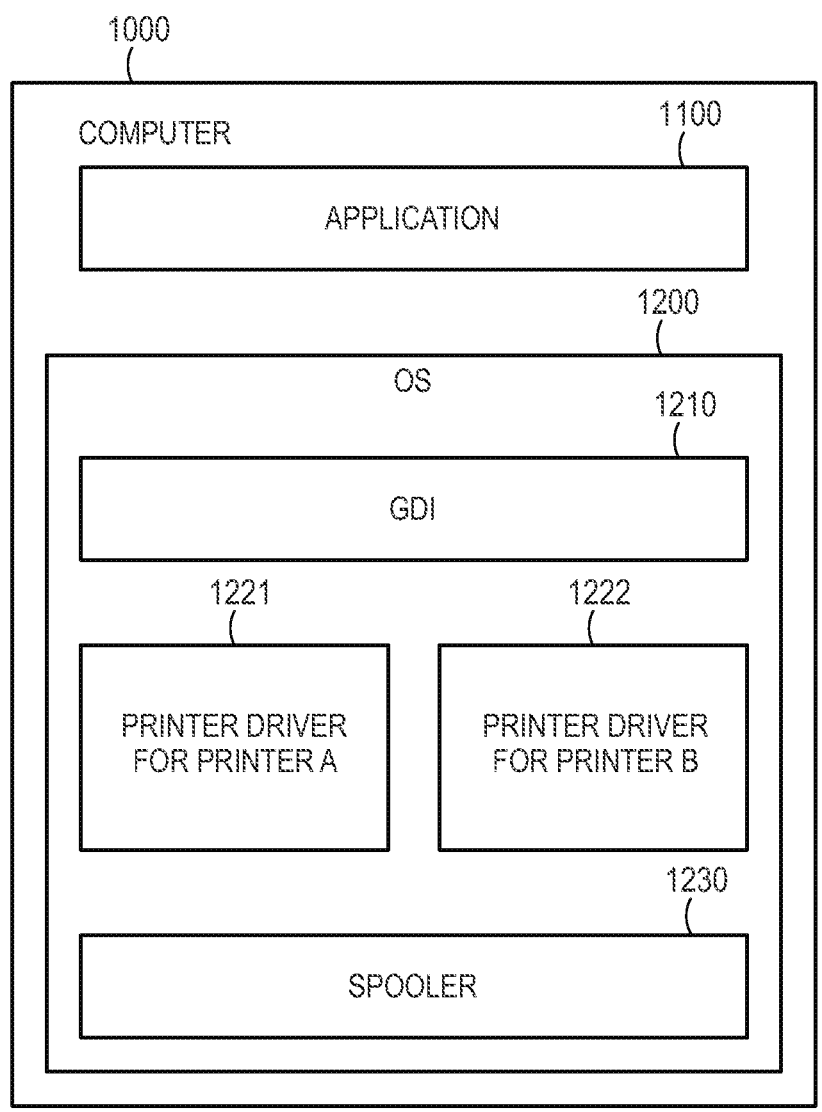
FIG. 4 is a block diagram showing the software configuration of a computer.

FIG. 4 is a block diagram showing an example of a module related to printing in the software configuration of the computer 1000.

An application 1100 refers to software, such as document creating (word processing) software or spreadsheet software, and is considered to have a printing function. If the printing function of the application 1100 is executed, a user can print out information currently displayed on the display unit 1010 of the computer 1000 by using the printer A2000 or the printer B3000. The printing function of the application 1100 is realized by calling an interface of a graphics device interface (GDI) 1210 described later.

An OS 1200 is an operating system and is software that controls the basic operation of the computer 1000. The application 1100 and printer drivers 1221 and 1222 are all managed by the OS 1200 and can be used by the installation to the OS 1200.

The GDI 1210 is a component inside the OS 1200, and the GDI 1210 provides an interface about drawing such as printing, to the outside.

The printer driver 1221 for the printer A displays a user interface (UI) for print settings to perform a printing operation using the printer A2000, and the printer driver 1221 generates drawing data (PDL: Page Description Language) that can be interpreted by the printer A2000 when performing the printing operation. The printer driver 1222 for the printer B is used for the same purposes and functions.

A spooler 1230 transmits the PDL generated above to the printer A2000 and the printer B3000.

Figure 5A:
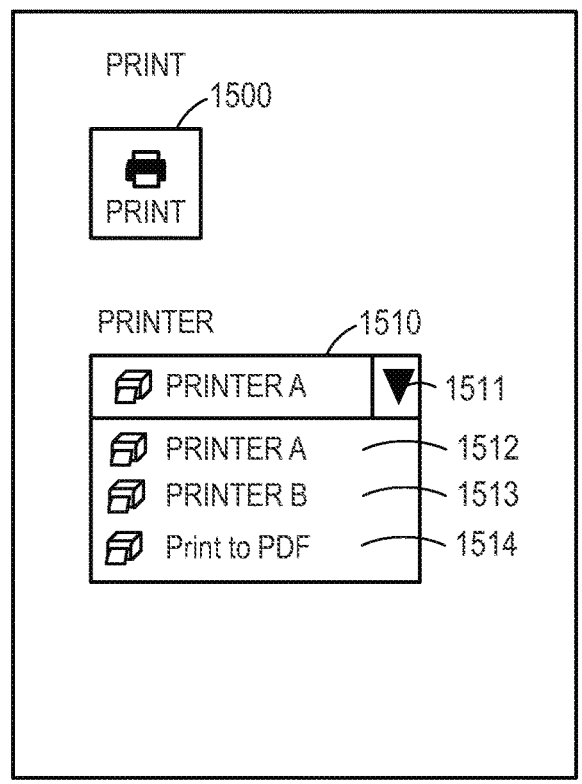
FIG. 5A shows a UI screen for a user to select a printer to be used for printing.
Figure 5B:
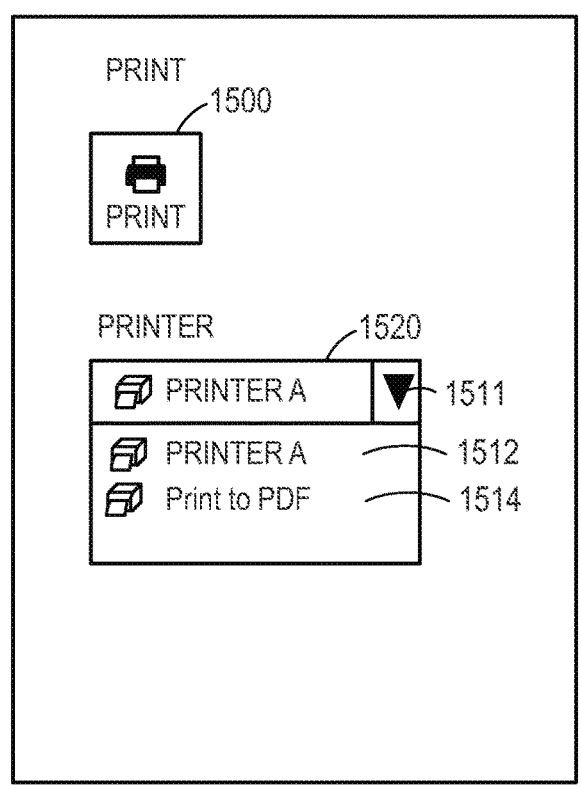
FIG. 5B shows a UI screen for a user to select a printer to be used for printing.

FIGS. 5A and 5B show examples of UI screens for a user to select a printer to be used for printing. The user interfaces (UI) shown in FIGS. 5A and 5B are displayed when a printing operation is performed via the application 1100.

FIG. 5A shows a UI through which a printer used for the printing operation can be selected from all printers registered in the computer 1000.

FIG. 5B shows a UI in which a part of the printers is excluded from selectable options.

In FIG. 5A, a combo box 1510 is a UI used for selecting a printer, and printers as selectable options 1512 to 1514 are displayed if an arrow button (reversed-triangle button) 1511 is pressed. The option 1512 corresponds to the printer A, and the option 1512 is an option for performing a printing operation using the printer A2000 installed at home. The option 1513 corresponds to the printer B, and the option 1513 is an option for performing a printing operation using the printer B3000 installed in the company. The option 1514 corresponds to "Print to PDF", and the option 1514 is an option for generating a PDF file. The option 1514 corresponding to the "Print to PDF" is called a "virtual printer" because no output to a real (physical) printer is executed.

The option 1512 corresponding to the printer A is associated with the printer driver 1221 for the printer A. The option 1513 corresponding to the printer B is associated with the printer driver 1222 for the printer B. The option 1514 corresponding to the "Print to PDF" is associated with a particular printer driver (not shown) for generating PDF files.

A print button 1500 arranged on the upper side of the UI is used for instructing a printing operation. The user selects a desired printer via the combo box 1510 and then presses the print button 1500 to instruct the selected printer to perform the actual printing process. If the print button 1500 is pressed, the application 1100 calls a printer driver corresponding to the printer selected through the combo box 1510 to issue a print instruction.

FIG. 5B shows the UI in which some printers are excluded from options selectable from a combo box 1520 used for selecting a printer. In the example of FIG. 5B, the option 1513 corresponding to the printer B is excluded from the selectable options in order to avoid performing an unintentional printing operation using the company printer B3000 via the home computer 1000.

The option 1512 for performing the printing operation by using the printer A2000 at home and the option 1514 for generating a PDF file are not excluded and are still selectable. The process for determining a printer to be displayed in the combo box used for selecting a printer will be described later with reference to the flowchart.

FIG. 6 is a diagram showing an example of a UI for setting to exclude, from selectable options of a printer list, a part of the printers that a user does not intend to use. This setting may be used to not use printers that are not installed in the current location of the user (e.g., the location of the computer 1000 installed).

The user can input a check on a check box 1700 to enable this setting. If this setting is enabled, printers that are not installed in the current location of the user (e.g., the location where the computer 1000 is installed) are excluded from the selectable printers (included in the combo box 1510, 1520 used when selecting a printer to perform a printing operation). If this setting is not enabled, all printers registered in the computer 1000 are displayed as selectable printers.

This setting may be provided as a setting of the OS 1200 in the computer 1000 or as an independent setting of the application 1100. If it is provided as a setting of the OS 1200, this setting is effective when the printing operation is performed using all applications 1100. If the setting is provided as an independent setting of the application 1100, this setting is effective only when the printing operation is performed using the corresponding application 1100.

FIG. 20 is a setting screen of the OS 1200 for connecting the OS 1200 on the computer 1000 to a virtual private network (VPN) 7000. A user can make a setting for the VPN connection in advance to the OS 1200 to start the designated VPN connection by activating (turning on) the preset VPN connection when connecting the computer 1000 to the VPN. A connection name 2001 is a field used for inputting an arbitrary name for the VPN connection to be set via the setting screen. A server name or address 2002 is a field used for inputting a global address of a VPN server associated with the desired VPN connection. The VPN server is a dedicated server arranged in the company network 6000 and prepared for connecting to the company network 6000 from the outside. A type of VPN 2003 is a field used for specifying a protocol of the VPN for communicating with a VPN server of a connection destination. The Protocol for the VPN may include Point-to-Point Tunnel Protocol (PPTP) and L2TP/IPsec using a pre-shared key. In this field, a communication protocol supported on the VPN server side is to be specified. A pre-shared key 2004 is a field used for inputting a shared key provided in advance for connecting to the VPN server. A user name 2005 and a password 2006 are fields used for inputting authentication information for connecting to the VPN server. If a save button 2007 is pressed, the OS 1200 saves the settings related to the VPN connection inputted in the above fields. The saved settings are registered in the OS 1200 with the name inputted to the connection name 2001 as a network adapter that is described later. The user can enable and disable the registered VPN connection at any timing. In the present embodiment, it is considered that a routing table used for connecting to the company network is properly set together with the registration of the VPN. The routing table will be described later with reference to FIG. 15.

FIG. 7 is a diagram showing IP addresses and subnet masks on the respective networks of the computer 1000, the printer A2000, and the printer B3000 in the present embodiment.

A network 1801 indicates names of target networks. An IP address 1802 indicates IP addresses of target devices in the respective networks. A subnet mask 1803 specifies ranges of the respective networks.

The computer 1000 according to the present embodiment is connected to both the home network 5000 and the virtual private network (VPN) 7000. Thus, the computer 1000 has an IP address for each network.

An IP address and a subnet mask on the home network 5000 are shown in a column 1811. In the present example, the IP address is "192.168.1.50" and the subnet mask is "255.255.255.0".

On the other hand, an IP address and a subnet mask on the virtual private network (VPN) 7000 are shown in a column 1812. In the present example, the IP address is "10.152.51.20" and the subnet mask is "255.255.255.255". FIG. 7 shows an example of connecting to the company network by routing, in which an address of a segment different from the company network is assigned as an IP address of the computer 1000 in the virtual private network (VPN) 7000. A case where an address of the same segment as the company network is assigned as an IP address of the computer 1000 in the virtual private network (VPN) 7000 will be described later in the sixth embodiment.

The printer A2000 is connected only to the home network 5000. The IP address and subnet mask of the printer A2000 are shown in a column 1813. In the present example, the IP address is "192.168.1.46" and the subnet mask is "255.255.255.0".

The printer B3000 is connected only to the company network 6000. The IP address and subnet mask of the printer B3000 are shown in a column 1814. In the present example, the IP address is "172.26.178.127" and the subnet mask is "255.255.248.0".

Next, a process for determining a list of printers (printer list) to be displayed in the combo boxes 1510 and 1520 of FIGS. 5A and 5B used for selecting a printer will be described with reference to the flowchart of FIG. 8.

Figure 8:
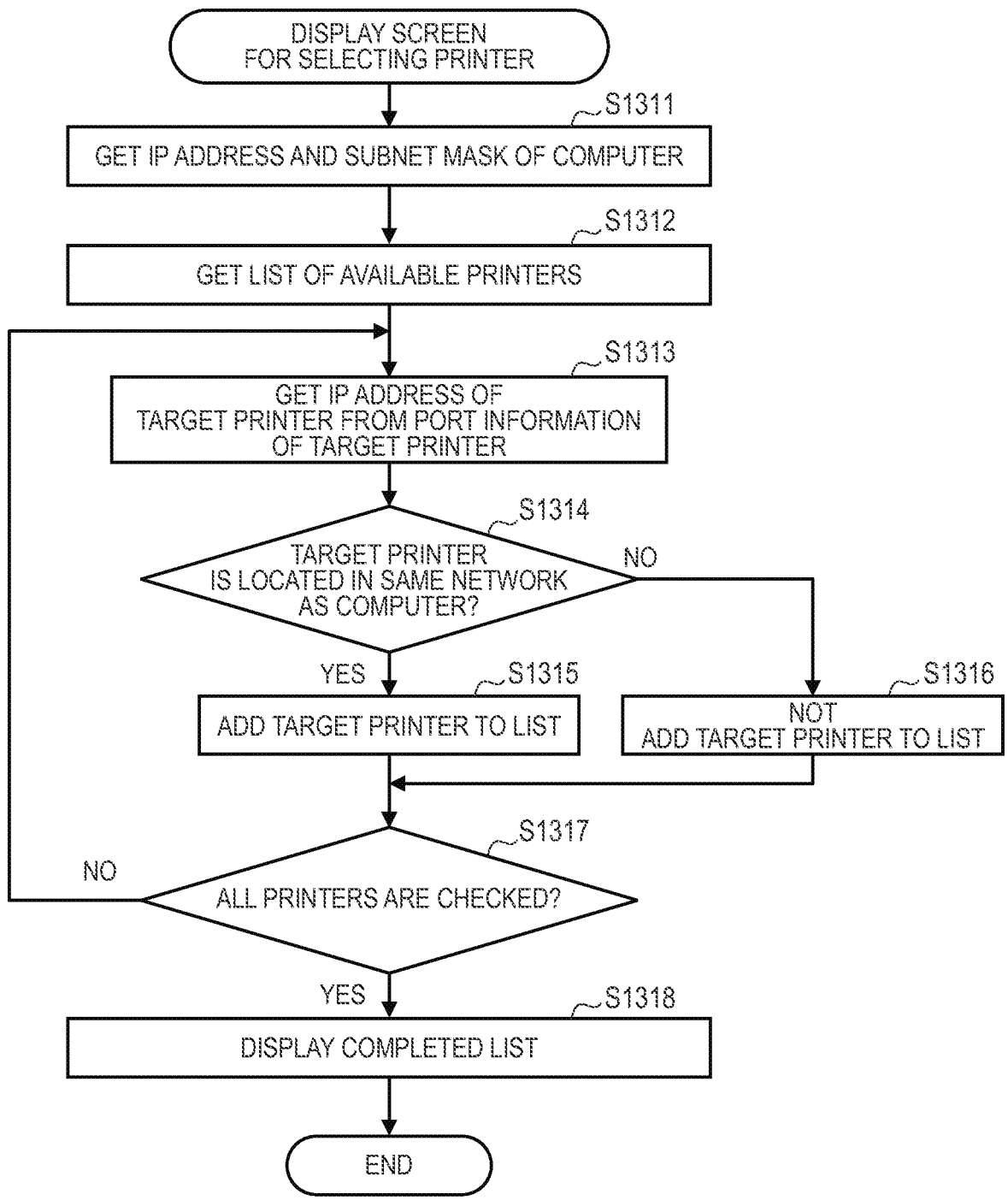
FIG. 8 is a flowchart of the process of determining options of printers according to the first embodiment.

FIG. 8 is a flowchart showing an example of processing for determining the options of the printers according to the first embodiment. This processing may be performed by the application 1100 or by the OS 1200, but will be described here as being performed by the application 1100. The flow is described in case that the check box 1700 shown in FIG. 6 is checked and activated. The processing described here is realized by the CPU 1041 loading the application 1100 stored in the storage unit 1030 into the memory 1042 and executing the application 1100.

The application 1100 first obtains an IP address and a subnet mask of the computer 1000 (step S1311). The obtained information corresponds to the information illustrated in FIG. 7, and can be obtained by a command such as "ipconfig" provided by the OS 1200.

FIG. 13 is a diagram showing a part of an exemplary result of executing the "ipconfig" command.

In the example shown here, multiple network adapters are registered for the single computer 1000, and an IP address and a subnet mask are displayed for each network. A network adapter generally refers to a network card (also referred to as a network interface card (NIC)), which is hardware for connecting to a network. The network adapters can be used for connecting to wired or wireless (like Wi-Fi) networks. In recent years, a network adapter called a virtual NIC that simulates a network card in software is also used, and this virtual NIC is used for connection to a virtual private network (VPN). The VPN connection set in FIG. 20 is also registered in the OS 1200 as a virtual NIC with the name registered via the connection name 2001.

In the present embodiment, it is considered that the virtual private network (VPN) 7000 is connected via a network adapter A1851. Therefore, the IP address of the computer 1000 in the virtual private network (VPN) 7000 can be acquired in association with the network adapter A1851. It is assumed that the home network 5000 is similarly connected via a network adapter B1852. Similarly, the IP address of the computer 1000 in the home network 5000 can be acquired in association with the network adapter B1852. Thus, if multiple network adapters are enabled in the single computer 1000, the computer 1000 has multiple IP addresses. The descriptions of selecting an IP address to be used for communications when a computer having multiple IP addresses connects to a network will be shown later using the routing table of FIG. 15.

Next, the application 1100 obtains a list of available printers (step S1312). Specifically, the information of the list can be obtained by using an application programming interface (API), such as "EnumPrinters", provided by the OS 1200. Thus, the application 1100 acquires a list of all printers (including virtual printers) available in the OS 1200. In the present embodiment, a list including three printers, i.e., "printer A", "printer B", and "print to PDF" is acquired.

Next, the application 1100 sets the printer A as a target printer and acquires an IP address of the printer A2000 from the port information of printer (step S1313). The port information represents information of the port to which the printer is connected, and the port information includes information of an IP address in the TCP/IP protocol in the case of a network connection. In case of the network connection, dedicated ports called WSD ports or IPP ports may be used. Even if these dedicated ports are in use, the IP address is to be determined using the information that each port has. Although not described in the flowchart, if the printer is not connected to a network as in "Print to PDF", the application 1100 adds that printer to a display list in step S1315, which will be described later.

Next, the application 1100 checks whether the computer 1000 is in the same network as the target printer (step S1314). The application 1100 determines whether the computer 1000 is in the same network as the target printer based on the information of the IP address and the subnet mask acquired in step S1311. Specifically, the application 1100 determines that the computer 1000 is in the same network as the target printer if the network addresses calculated by taking "AND" (i.e., performing logical multiplication) of the respective IP addresses and the subnet masks are the same. That is, if the network segment identified by the IP address of the computer 1000 matches the network segment identified by the IP address of the target printer, it is considered that the target printer belongs to the same network as the computer 1000. On the other hand, it is considered that the target printer does not belong to the same network as the computer 1000 if the network segment identified by the IP address of the computer 1000 does not match the network segment identified by the IP address of the target printer.

If it is confirmed that the target printer is in the same network as the computer 1000 (Yes in step S1314), the application 1100 adds the target printer to the display list (step S1315) and the process proceeds to step S1317.

If it is confirmed that the target printer is not in the same network as the computer 1000 (No in step S1314), the application 1100 does not add the target printer to the display list (step S1316) and the process proceeds to step S1317.

For example, in case of the printer A2000, it is determined that the target printer is in the same network as the computer 1000 (Yes in step S1314) because both the computer 1000 and the printer A2000 are included within the network address "192.168.1.0" of the home network 5000. Therefore, the application 1100 adds the "printer A" to the display list (step S1315).

On the other hand, the network to which the printer B3000 belongs is "172.26.176.0" while the networks to which the computer 1000 belongs are "192.168.1.0" and "10.152.51.20". Therefore, it is determined that the printer B3000 is not in the same network as the computer 1000 (No in step S1314). Therefore, the application 1100 does not add the "printer B" to the display list (step S1316).

Since "Print to PDF" is not associated with a network connection, the application 1100 adds "Print to PDF" to the display list as described above (step S1315).

In step S1317, the application 1100 determines whether or not all printers have been checked to determine if they are in the same network as the computer 1000 (steps S1313 to S1316). If there is a printer that has not been checked yet (No in step S1317), the application 1100 executes a controlling process to perform the processes of steps S1313 to S1316 for the printer that has not been checked.

On the other hand, if all the printers have been checked (Yes in step S1317), the application 1100 advances the process to step S1318.

In step S1318, the application 1100 displays the display list completed by the above-described processing and ends the process of this flowchart.

As described above, it is determined whether the printer belongs to the same network as the computer 1000, and the printer determined to belong to the same network as the computer 1000 is displayed in a printer list for the user so as to select a printer to be used for printing. Thus, only the printers present in the same network at the timing of the user performing a printing operation are listed. More specifically, if the check box 1700 of FIG. 6 is not checked (deactivated) when performing a printing operation at home, the UI of FIG. 5A is displayed. If the check box 1700 of FIG. 6 is checked (activated), the UI shown in FIG. 5B is displayed. Thus, it is possible to avoid a risk of selecting the printer of the company when performing a printing operation at home. It is also possible to avoid a risk of selecting the printer of the home when performing a printing operation in the company. As a result, it is possible to suppress the occurrence of an error (when unconnected to the VPN) and a risk of leaking information outputted using the company printer (when connected to the VPN) if the printing operation is performed by mistakenly selecting the printer installed in the company during work at home. Consequently, the usability when a user performs a printing operation can be improved.

Second Embodiment

In the second embodiment, another method of generating a list of options of printers performing a printing operation is shown. In the present embodiment, examples of the configuration and UIs are same as the first embodiment, and therefore the descriptions thereof will be omitted. Here, only the flow for generating a list of options of printers will be described as a difference.

Hereinafter, the procedure according to the present embodiment for determining a list of printers (printer list) to be displayed in the combo boxes 1510 and 1520 for selecting a printer as shown in FIGS. 5A and 5B will be described with reference to the flowchart of FIG. 9.

Figure 9:
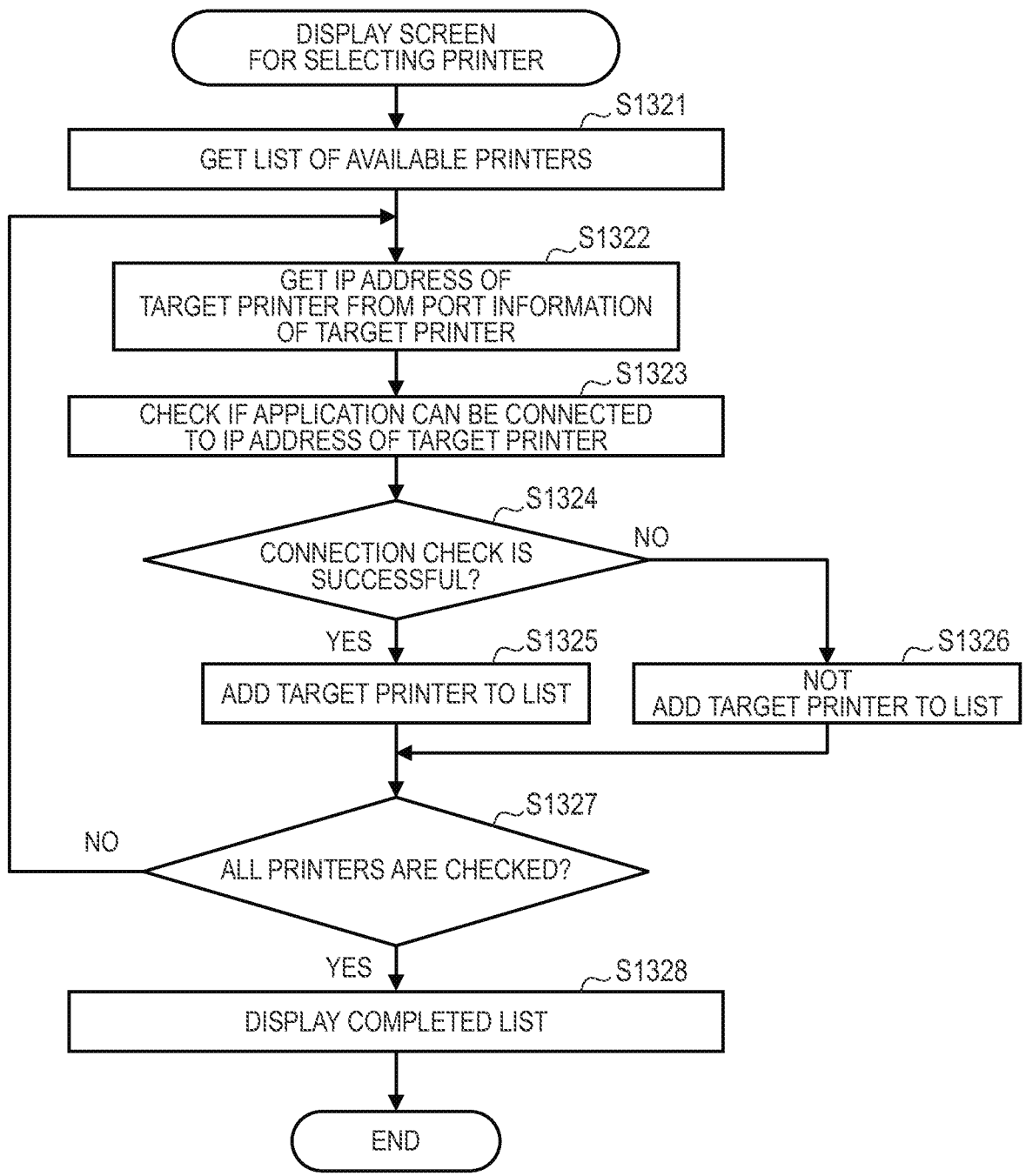
FIG. 9 is a flowchart of the process of determining options of printers according to the second embodiment.

FIG. 9 is a flowchart showing an example of processing for determining options of printers according to the second embodiment. As in the first embodiment, this processing may be performed by the application 1100 or by the OS 1200, but it will be described here as being performed by the application 1100. The flow in case that the check box 1700 shown in FIG. 6 is checked (activated) will be described. The processing described here is realized by the CPU 1041 loading the application 1100 stored in the storage unit 1030 into the memory 1042 and executing the application 1100.

The application 1100 first obtains a list of available printers (step S1321). This processing is same as the process of step S1312 in the first embodiment.

Next, the application 1100 set the printer A2000 as a first target printer, and obtains an IP address of the target printer from the port information of the printer (step S1322). This process is same as the process of step S1313 in the first embodiment. Although not described in the flowchart, if the printer is not connected to a network as in "Print to PDF", the application 1100 adds the printer to the display list in step S1325, which will be described later.

Next, the application 1100 checks the connection with the IP address of the target printer (step S1323). Specifically, the connection check can be executed by a command such as "ping" provided by the OS 1200. FIG. 14A shows an example of executing the "ping" command according to the second embodiment. A user can check if the target printer is connected to a network by executing the "ping" command to the specified IP address. More specifically, if a response is received from the destination IP address as a result of the "ping" command, it is determined that the application 1100 is able to connect to the target printer. On the other hand, if the request times out or if a response indicating that the destination network or destination host could not be reached is returned as a result of the "ping" command, it is determined that the application 1100 could not connect to the target printer.

Next, the application 1100 determines whether or not the connection can be made by the connection check executed in step S1323 (step S1324). If the connection can be established (Yes in step S1324), the application 1100 adds the target printer to the display list (step S1325) and the process proceeds to step S1327.

On the other hand, if the connection cannot be established (No in step S1324), the application 1100 does not add the target printer to the display list (step S1326), and the process proceeds to step S1327.

For example, in case of the printer A2000, the computer 1000 is located at home in the environment according to the present embodiment. Thus, the connection can normally be established without any problem (Yes in step S1324). Therefore, the application 1100 adds the "printer A" to the display list (step S1325).

In case of the printer B3000, if the computer 1000 is connected to the virtual private network (VPN) 7000, the connection to the printer B3000 can also be established (YES in step S1324). In this case, the application 1100 adds the "printer B" to the display list (step S1325). On the other hand, if the computer 1000 is not connected to the virtual private network (VPN) 7000, the connection to the printer B3000 cannot be established (No in step S1324). In this case, the application 1100 does not add the "printer B" to the display list (step S1326).

Since "Print to PDF" is not associated with a network connection, the application 1100 adds "Print to PDF" to the display list as described above (step S1325).

In step S1327, the application 1100 determines whether or not the connection check (steps S1322 to S1326) has been performed for all printers. If there is a printer that has not been checked yet (No in step S1327), the application 1100 executes a controlling process to perform the processes of steps S1322 to S1326 for the printer that has not been checked.

On the other hand, if all the printers are checked (Yes in step S1327), the application 1100 advances the process to step S1328.

In step S1328, the application 1100 displays the display list completed by the above-described processing and ends the processing of this flowchart.

Performing the above processing allows to display a list including only the printers to which the connection is confirmed at the timing of executing a printing operation. More specifically, if the check box 1700 of FIG. 6 is not checked (deactivated) when perform a printing operation at home, the UI shown in FIG. 5A is displayed. If the check box 1700 in FIG. 6 is checked (activated), the display changes depending on whether the computer 1000 is connected to the virtual private network (VPN) 7000 or not. If the computer 1000 is connected to the virtual private network (VPN) 7000, the UI as shown in FIG. 5A is displayed, and if the computer 1000 is not connected to the VPN 7000, the UI as shown in FIG. 5B is displayed. The above configuration avoids a risk of selecting a printer unconnected to the computer 1000 when performing a printing operation at home, which removes a risk of forcing the user to reselect a correct printer. Thus, the user convenience can be enhanced, and usability when performing a printing operation can be improved.

Third Embodiment

In the third embodiment, another method of generating a list of options of the printer performing a printing operation is shown. In the present embodiment, examples of the configuration diagrams and UIs are same as those in the first embodiment, and therefore the descriptions thereof will be omitted. Here, only the flow for generating the list of options of the printer will be described as a difference.

Hereinafter, the procedure for determining a list of printers (printer list) to be displayed in the combo boxes 1510 and 1520 for selecting a printer shown in FIGS. 5A and 5B according to the present embodiment will be described with reference to the flowchart of FIG. 10.

Figure 10:
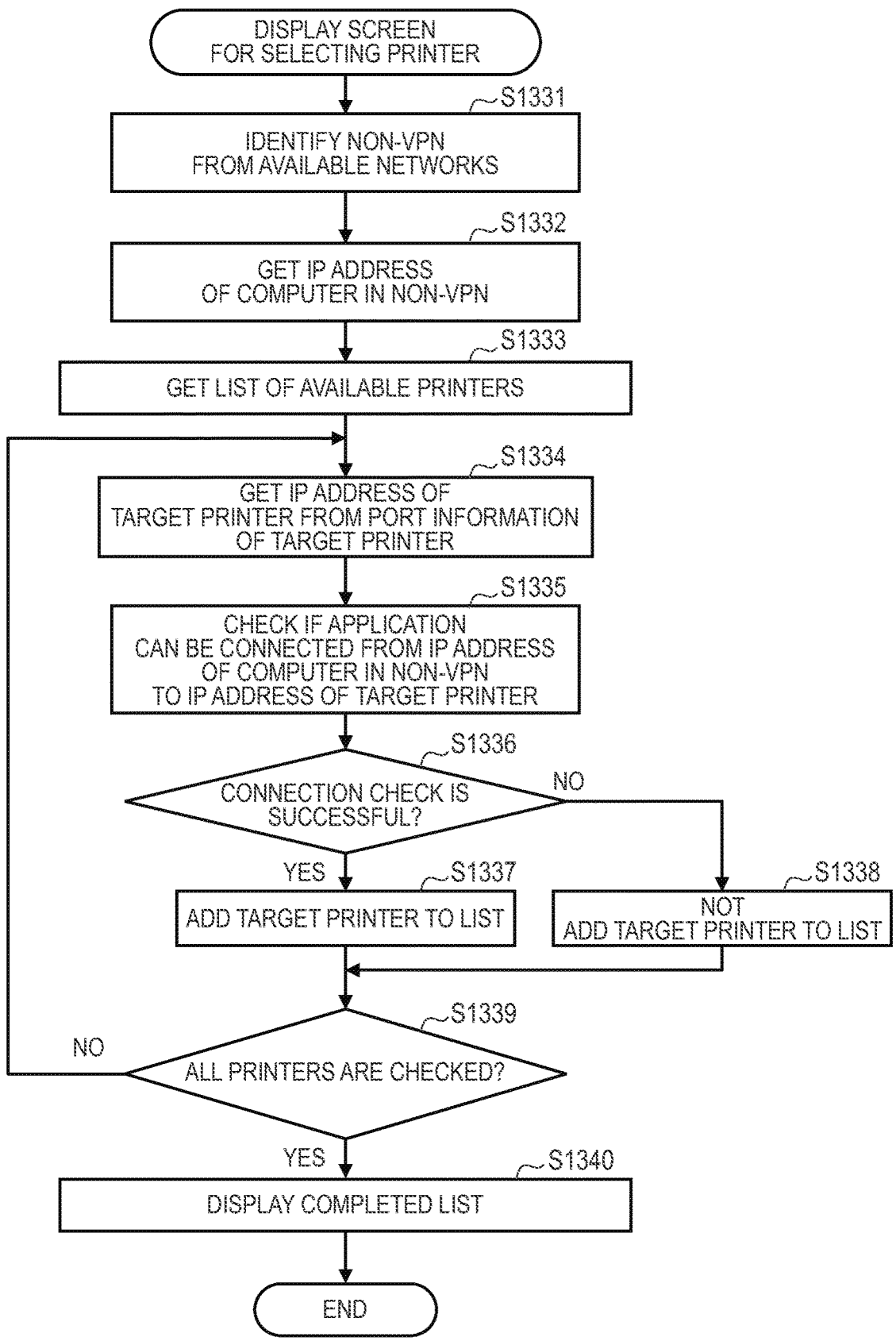
FIG. 10 is a flowchart of the process of determining options of printers according to the third embodiment.

FIG. 10 is a flowchart showing an example of processing for determining the options of the printer according to the third embodiment. As in the first embodiment, this processing may be performed by the application 1100 or by the OS 1200, but will be described here as being performed by the application 1100. Here, the flow will be described in case that the check box 1700 shown in FIG. 6 is checked (activated). The processing described here is realized by the CPU 1041 loading the application 1100 stored in the storage unit 1030 into the memory 1042 and executing the application.

The application 1100 first determines a network that is not a virtual private network (non-VPN) among networks available to the computer 1000 (step S1331). More specifically, the application 1100 acquires the attributes of the network adapters used in the respective networks from the OS 1200 and determines whether or not the network adapters are prepared for VPN connection. If the network adapter is managed by the OS 1200 as a network adapter registered by the method shown in FIG. 20, that network adapter can be determined as a network adapter for VPN connection. If the application 1100 acquires a protocol used by the network adapter and then determines that the protocol is to be used in the VPN such as Point to Point Tunnel Protocol (PPTP) or L2TP/IPsec, the application 1100 may determines that the network adapter is prepared for VPN connection. In the configuration of the present embodiment, only the home network 5000 is a network corresponding to the non-VPN.

Next, the application 1100 acquires the IP address of the computer 1000 in the non-VPN determined in step S1331 (step S1332). The command used here is same as the command used in the process of step S1311 in the first embodiment, but only the IP addresses corresponding to the network adapters associated with the non-VPN is acquired because multiple network adapters are registered. The application 1100 determines a network adapter associated with the non-VPN, for example, based on information of the VPN managed by the OS 1200. Alternatively, VPN or non-VPN may be determined based on information of the network adapters or the network profiles.

In the present embodiment, the IP address acquired in step S1332 is "192.168.1.50" in the home network 5000.

Next, the application 1100 acquires a list of available printers (step S1333). This processing is same as the process of step S1312 of the first embodiment.

Next, the application 1100 sets the printer A2000 as a target printer, and acquires the IP address of the first target printer from the port information of the printer (step S1334). This processing is same as the process of step S1313 in the first embodiment. Although not described in the flowchart, if the printer is not connected to a network as in "Print to PDF", the application 1100 adds that printer to the display list in step S1337, which will be described later.

Next, the application 1100 executes the connection check from the IP address of the computer 1000 in the non-VPN to the IP address of the target printer (step S1335). As in step S1323 of the second embodiment, the connection check can be performed by a command such as "ping" provided by the OS 1200. FIG. 14B shows an example of executing the "ping" command in the third embodiment. This differs from FIG. 14A shown in the second embodiment on the fact that the IP address of the connection source is also specified by the "/S" option such as "ping/S 192.168.1.50". In the present embodiment, "192.168.1.50", which is the IP address of the computer 1000 in the non-VPN network, is specified as the IP address of the connection source. With this method, the connection check succeeds only if the target printer is connected via the home network 5000, and the connection check fails if the target printer is connected via the virtual private network (VPN) 7000.

Next, the application 1100 determines whether or not the connection can be established through the connection check executed in step S1335 (step S1336). If the connection can be established (Yes in step S1336), the application 1100 adds the target printer to the display list (step S1337) and advances the process to step S1339.

On the other hand, if the connection cannot be established (No in step S1336), the application 1100 does not add the target printer to the display list (step S1338), and advances the process to step S1339.

For example, in the case of the printer A2000, the IP address of the computer 1000 in the non-VPN network is used as the connection source to check the connection. Thus, the connection check is normally successful (Yes in step S1336). Therefore, the application 1100 adds "printer A" to the display list (step S1337).

In the case of the printer B3000, the connection check fails (No in step S1336) because the IP address of the computer 1000 in the non-VPN network is used as the connection source to check the connection. In this case, the application 1100 does not add "printer B" to the display list (step S1338).

Since "Print to PDF" is not associated with a network connection, the application 1100 adds "Print to PDF" to the display list as described above (step S1337).

In step S1339, the application 1100 determines whether or not the connection check (steps S1334 to S1338) has been performed for all printers. If there is a printer that has not been checked yet (No in step S1339), the application 1100 executes a controlling process to perform the processes of steps S1334 to S1338 for the printer that has not been checked yet.

On the other hand, if all the printers are checked (Yes in step S1339), the application 1100 advances the process to step S1340.

In step S1340, the application 1100 displays the list completed by the above-described processing and ends the processing of this flowchart.

The above processing is executed to confirm the connection from the IP address of the computer 1000 in the non-VPN to the IP address of the target printer. In response to the confirmation of the connection, it is determined that the target printer belongs to the same network as the computer 1000, and the target printer is added to the display list. In response to the fact that the connection cannot be confirmed, the application 1100 determines that the target printer does not belong to the same network as the computer 1000, and the application 1100 determines not to add the target printer to the display list. Performing the above processing causes to display the UI of FIG. 5B regardless of whether or not the computer 1000 is connected to the virtual private network (VPN) 7000. This allows to avoid a risk of accidentally selecting the company printer B3000 when performing a printing operation at home, and to improve the usability when performing a printing operation.

Fourth Embodiment

The fourth embodiment shows another method of generating a list of options of the printer that performs a printing operation. In the present embodiment, examples of the configuration diagrams and UIs are same as those in the first embodiment, and therefore the descriptions thereof will be omitted. Here, only the flow for generating the list of options of the printer will be described as a difference.

Hereinafter, the procedure for determining a list of printers (printer list) to be displayed in the combo boxes 1510 and 1520 for selecting a printer shown in FIGS. 5A and 5B according to the present embodiment will be described with reference to the flowchart of FIG. 11.

Figure 11:
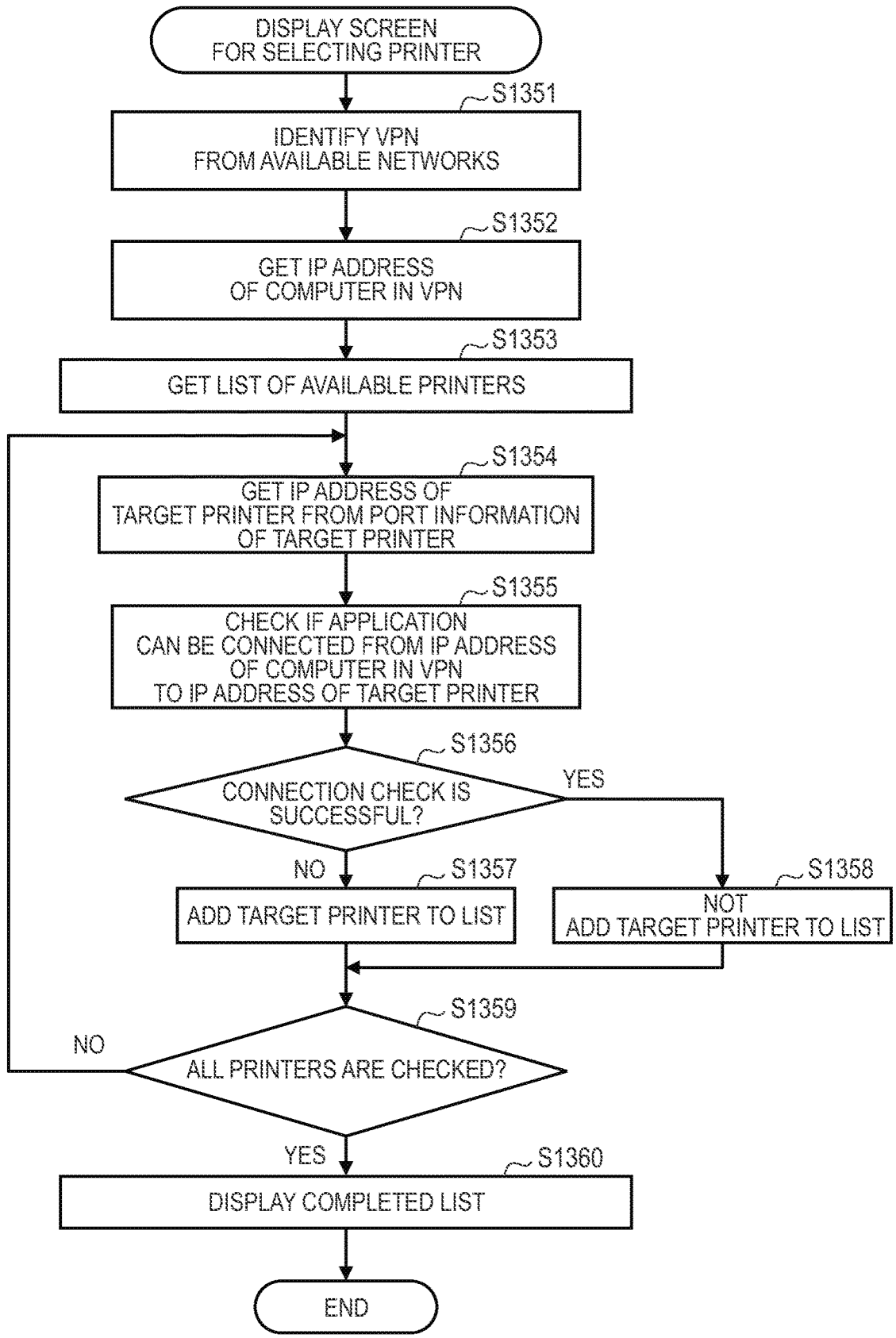
FIG. 11 is a flowchart of the process of determining options of printers according to the fourth embodiment.

FIG. 11 is a flowchart showing an example of processing for determining options of the printer according to the fourth embodiment. As in the first embodiment, this processing may be performed by the application 1100 or by the OS 1200, but it will be described here as being performed by the application 1100. Here, the flow will be described in case that the check box 1700 in FIG. 6 is checked (activated). The processing described here is realized by the CPU 1041 loading the application 1100 stored in the storage unit 1030 into the memory 1042 and executing the application 1100.

The application 1100 first determines a virtual private network (VPN) among the networks available to the computer 1000 (step S1351).

In the configuration of the present embodiment, only the virtual private network (VPN) 7000 is determined as a VPN.

Next, the application 1100 acquires the IP address of the computer 1000 in the virtual private network (VPN) 7000 determined in step S1351 (step S1352). The command used here is same as the command used in the process of step S1332 in the third embodiment, and only the IP address corresponding to the network adapter associated with the virtual private network (VPN) is acquired. In the present embodiment, the IP address acquired in step S1352 is "10.152.51.20" in the virtual private network (VPN) 7000.

Next, the application 1100 acquires a list of available printers (step S1353). This processing is same as the processing of step S1312 in the first embodiment.

Next, the application 1100 sets the printer A2000 as a first target printer, and acquires the IP address of the target printer from the port information of the printer (step S1354). This processing is the same as the processing of step S1313 in the first embodiment. Although not described in the flowchart, if the printer is not connected to a network as in "Print to PDF", the application 1100 adds that printer to the display list in step S1357, which will be described later.

Next, the application 1100 executes the connection check from the IP address of the computer 1000 in the virtual private network (VPN) 7000 to the IP address of the target printer (step S1355). The connection check can be performed by a command such as "ping" provided by the OS 1200. FIG. 14C shows an example of executing the "ping" command in the fourth embodiment. Here, an address "10.152.51.20", which is the IP address of the computer 1000 in the virtual private network (VPN), is designated as the IP address of the connection source by using the "/S" option such as "ping/S 10.152.51.20". With this method, the connection check succeeds only if the target printer is connected via the virtual private network (VPN) 7000, and the connection check fails if the target printer is connected via the home network 5000.

Next, the application 1100 determines whether or not the connection can be established by the connection check executed in step S1355 (step S1356). If the connection cannot be established (No in step S1356), the application 1100 adds the target printer to the display list (step S1357), and advances the process to step S1359.

On the other hand, if the connection can be established (Yes in step S1356), the application 1100 does not add the target printer to the display list (step S1358), and advances the process to step S1359.

For example, in the case of the printer A2000, establishing a connection fails (No in step S1356) because the connection check is executed using the IP address of the virtual private network (VPN) 7000 as the connection source. Therefore, the application 1100 adds the "printer A" to the display list (step S1357).

In the case of the printer B3000, establishing a connection succeeds (Yes in step S1356) because the connection check is executed using the IP address of the virtual private network (VPN) 7000 as the connection source. In this case, the application 1100 does not add the "printer B" to the display list (step S1358).

Since "Print to PDF" is not associated with a network connection, the application 1100 adds the "Print to PDF" to the display list as described above (step S1357).

In step S1359, the application 1100 determines whether or not the connection check (steps S1354 to S1358) has been performed for all printers. If there is a printer that has not been checked yet (No in step S1359), the application 1100 performs a controlling process to execute the processes of S1354 to step S1358 for the printer that has not been checked yet.

On the other hand, if all the printers are checked (Yes in step S1359), the application 1100 advances the process to step S1360.

In step S1360, the application 1100 displays the list completed by the above-described processing and ends the processing of this flowchart.

According to the above processing, the application 1100 executes the connection check from the IP address of the computer 1000 in the VPN to the IP address of the target printer. In response to the fact that the connection cannot be established, the application 1100 determines that the target printer belongs to the same network as the computer 1000, and adds the target printer to the display list. On the other hand, in response to the fact that the connection can be established, the application 1100 determines that the target printer does not belong to the same network as the computer 1000, and does not add the target printer to the display list. Performing the above processing allows to exclude, from the display list, only the printers to which the computer 1000 is connectable via the virtual private network (VPN) 7000 that is connected with the computer 1000. That is, the user interface shown in FIG. 5B is displayed if the computer 1000 is connected to the virtual private network (VPN) 7000, and the user interface shown in FIG. 5A is displayed if the computer 1000 is not connected to the virtual private network (VPN) 7000. This method also allows the avoiding of a risk of accidentally executing a printing operation by using a printer installed in the company (office) when the user is working at home, and to improve the usability when performing a printing operation.

Fifth Embodiment

The fifth embodiment shows another method of generating a list of options of the printer performing a printing operation. In the present embodiment, examples of the configuration diagrams and UIs are same as those in the first embodiment, and therefore the descriptions thereof will be omitted. Here, only the flow for generating the list of options of the printer will be described as a difference.

Hereinafter, the procedure for determining a list of printers (printer list) to be displayed in the combo boxes 1510 and 1520 for selecting a printer shown in FIGS. 5A and 5B in the present embodiment will be described with reference to the flowchart of FIG. 12.

Figure 12:
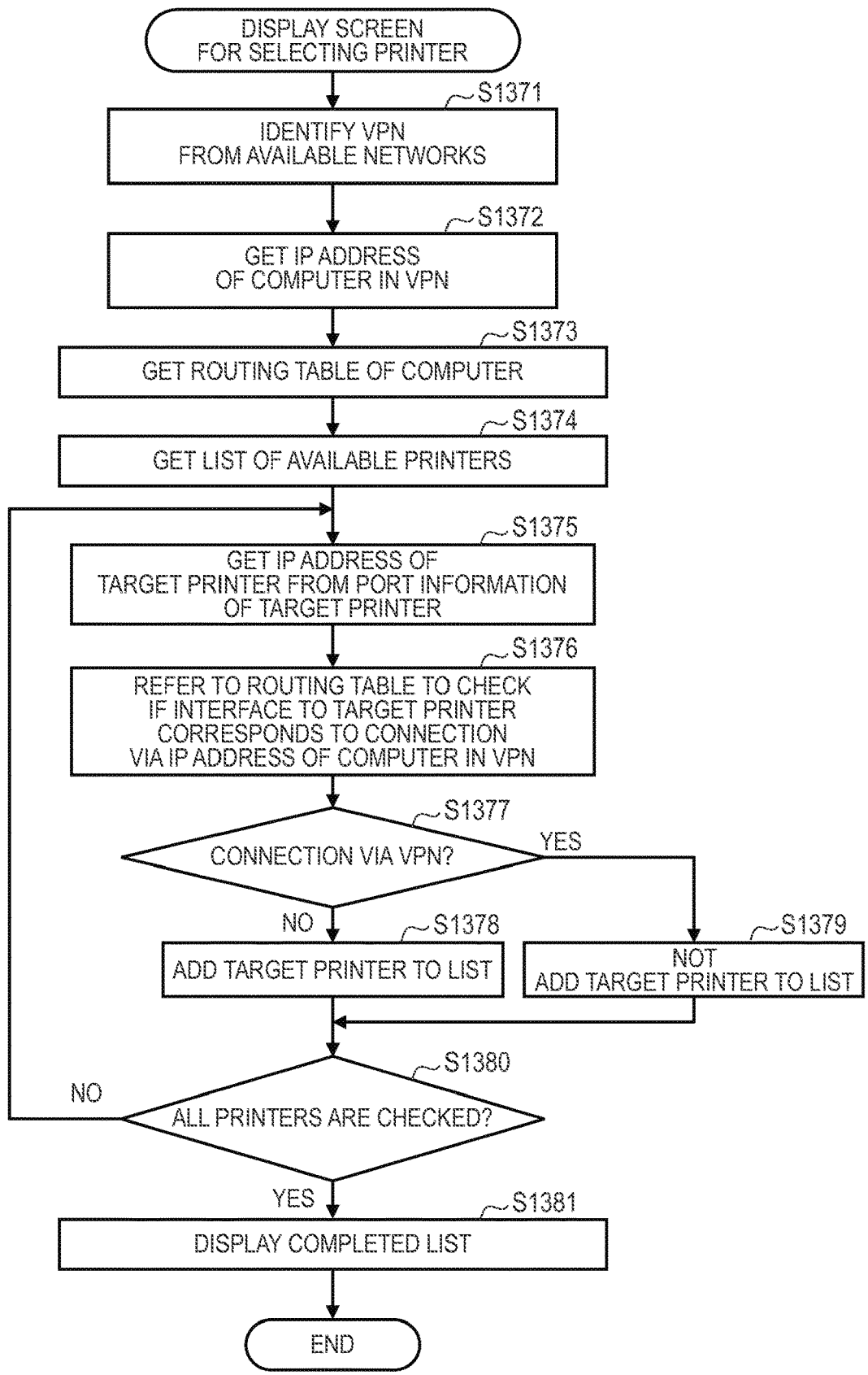
FIG. 12 is a flowchart of the process of determining options of printers according to the fifth embodiment.

FIG. 12 is a flowchart showing an example of processing for determining options of the printer according to the fifth embodiment. In the first embodiment, the processing may be performed by the application 1100 or by the OS 1200, but it will be described here as being performed by the application 1100. Here, the flow will be described in case that the check box 1700 in FIG. 6 is checked (activated). The processing described here is realized by the CPU 1041 loading the application 1100 stored in the storage unit 1030 into the memory 1042 and executing the application 1100.

The application 1100 first identifies a virtual private network (VPN) among the networks available to the computer 1000 (step S1371).

This processing is same as the processing of step S1351 in the fourth embodiment. In the configuration of the present embodiment, only the virtual private network (VPN) 7000 is identified as a virtual private network (VPN).

Next, the application 1100 acquires the IP address of the computer 1000 in the virtual private network (VPN) 7000 identified in step S1371 (step S1372). This processing is same as the processing of step S1352 in the fourth embodiment. In the present embodiment, the IP address acquired in step S1372 is "10.152.51.20" in the virtual private network (VPN) 7000.

Next, the application 1100 obtains a routing table of the computer 1000 (step S1373). The routing table is a table describing a list of routes that are referenced when a connection is made from the computer 1000 to the destinations of the respective networks.

The routing table of the computer 1000 can be acquired by a command such as "route print" provided by the OS 1200. FIG. 15 shows an example of the routing table acquired by the "route print" command.

Next, the application 1100 acquires a list of available printers (step S1374). This processing is same as the processing of step S1312 in the first embodiment.

Next, the application 1100 sets the printer A2000 as a first target printer, and the application 1100 acquires the IP address of the target printer from the port information of the printer (step S1375). This processing is same as the processing of step S1313 in the first embodiment. Although not described in the flowchart, if the printer is not connected to a network as in "Print to PDF", the application 1100 adds that printer to the display list in step S1378, which will be described later.

Next, the application 1100 refers to the acquired routing table to check whether the interface to the target printer uses a path via the IP address of the computer 1000 in the virtual private network (VPN) 7000 (step S1376).

Hereinafter, step S1376 will be described with reference to FIG. 15.

The interface passed through when connecting to a specific destination can be derived from the information of the network destination 1911 and the netmask 1912. Specifically, if there is the network destination 1911 that matches a result of taking "AND" of the IP address of the target printer as the destination and the netmask 1912, the interface 1913 of that row is the interface passed through when connecting to the destination. If there are multiple rows matched, the longest matching row is selected according to the principle of the longest matching.

For example, a case of the printer A2000 as a destination will be described. In this case, the "AND" (i.e., logical multiplication) is taken between an address "192.168.1.46" that is the IP address of the printer A2000 as the destination and the netmask 1912 of each row included in the routing table to find a match with the network destination 1911. As a result, the rows 1902 and 1903 included in the routing table match the network destination 1911. The longest match corresponds to the row 1903 included in the routing table. This shows that the interface to be passed through in case of the printer A2000 as the destination is the IP address corresponding to "192.168.1.50". This is different from the IP address "10.152.51.20" of the computer 1000 in the virtual private network (VPN) 7000 acquired in step S1372.

Therefore, it can be found that the connection to the printer A2000 does not correspond to a connection via the virtual private network (VPN) 7000.

A case of the printer B3000 as the destination will be described below. In this case, the "AND" (i.e., logical multiplication) is taken between an IP address "172.26.178.127" that is the IP address of the printer B3000 as the destination and the netmask 1912 of each row included in the routing table to find a match with the network destination 1911. As a result, only the row 1901 of the routing table matches the network destination 1911. This shows that the interface to be passed through in case of the printer B3000 as the destination is the IP address corresponding to "10.152.51.20". This corresponds to the IP address "10.152.51.20" of the computer 1000 in the virtual private network (VPN) 7000 acquired in step S1372. Therefore, it can be found that the connection to the printer B3000 corresponds to a connection via the virtual private network (VPN) 7000.

Next, the application 1100 determines, based on in a result of the confirmation step in S1376, whether or not the connection is made via the virtual private network (VPN) 7000 (step S1377). If the connection is not via the virtual private network (VPN) 7000 (No in step S1377), the application 1100 adds the target printer to the display list (step S1378), and advances the process to step S1380.

If the connection is via the virtual private network (VPN) 7000 (Yes in step S1377), the application 1100 does not add the target printer to the display list (step S1379), and advances the process to step S1380.

For example, in the case of the printer A2000, the connection is not via the virtual private network (VPN) 7000 (No in step S1377). Thus, the application 1100 adds the "printer A" to the display list (step S1378).

In the case of the printer B3000, the connection is via the virtual private network (VPN) 7000 (Yes in step S1377). Thus, the application 1100 does not add the "printer B" to the display list (step S1379).

Since "Print to PDF" is not associated with a network connection, the application 1100 adds the "Print to PDF" to the display list as described above (step S1378).

In step S1380, the application 1100 determines whether or not all printers have been checked about the connection through the VPN (steps S1375 to S1379). If there is a printer that has not been checked yet (No in step S1380), the application 1100 executes a controlling step to perform the processes of steps S1375 to S1379 for the printer that has not been checked yet.

On the other hand, if all the printers have been checked (Yes in step S1380), the application 1100 advances the process to step S1381.

In step S1381, the application 1100 displays the list completed by the above-described processing and ends the processing of this flowchart.

In the above processing, the application 1100 checks whether a route to be connected to the target printer is via the IP address of the computer 1000 in the VPN. In response to the confirmation that the route is not connected to the target printer via the IP address of the computer 1000 in the VPN, the application 1100 determines that the target printer belongs to the same network as the computer 1000, and adds the target printer to the display list. On the other hand, in response to the confirmation that the route is connected to the target printer via the IP address of the computer 1000 in the VPN, the application 1100 determines that the target printer does not belong to the same network as the computer 1000, and does not add the target printer to the display list.

Performing the above processing allows the exclusion, from the display list, of only the printers to which the computer 1000 is connected via the virtual private network (VPN) 7000 that is connected with the computer 1000. That is, the user interface shown in FIG. 5B is displayed if the computer 1000 is connected to the virtual private network (VPN) 7000, and the user interface shown in FIG. 5A is displayed if the computer 1000 is not connected to the virtual private network (VPN) 7000. This method also allows to avoid a risk of accidentally executing a printing operation by using a printer installed in the company (office) when the user is working at home, and to realize the faster processing compared to the method according to the fourth embodiment because the actual connection check becomes unnecessary, which improves the usability when performing a printing operation.

Sixth Embodiment

In the sixth embodiment, a part of the flow shown in the first embodiment for generating the list of options of the printer shown in FIG. 8 is modified. In the present embodiment, examples of the configuration diagrams and UIs are the same as those in the first embodiment, and therefore the descriptions thereof will be omitted. Here, only the differences from the flow for generating the list of options of the printer shown in FIG. 8 will be described.

In the processing flow of the first embodiment, IP addresses in all networks (in the example above, the home network 5000 and the virtual private network (VPN) 7000) to which the computer 1000 is connected are acquired. Then, it is confirmed whether each printer is installed in the same network by using these IP addresses, and printers to be added to the display list are determined. In the sixth embodiment, as in the third embodiment, a non-VPN is specified among the networks to which the computer 1000 is connected, and only the IP addresses in the non-VPN are acquired. Then, it is confirmed whether each printer is installed in the same network by using the IP address of the non-VPN, and printers to be added to the display list are decided.

Hereinafter, the procedure for determining a list of printers (printer list) to be displayed in the combo boxes 1510 and 1520 for selecting a printer shown in FIGS. 5A and 5B according to the present embodiment will be described with reference to the flowchart of FIG. 16.

Figure 16:
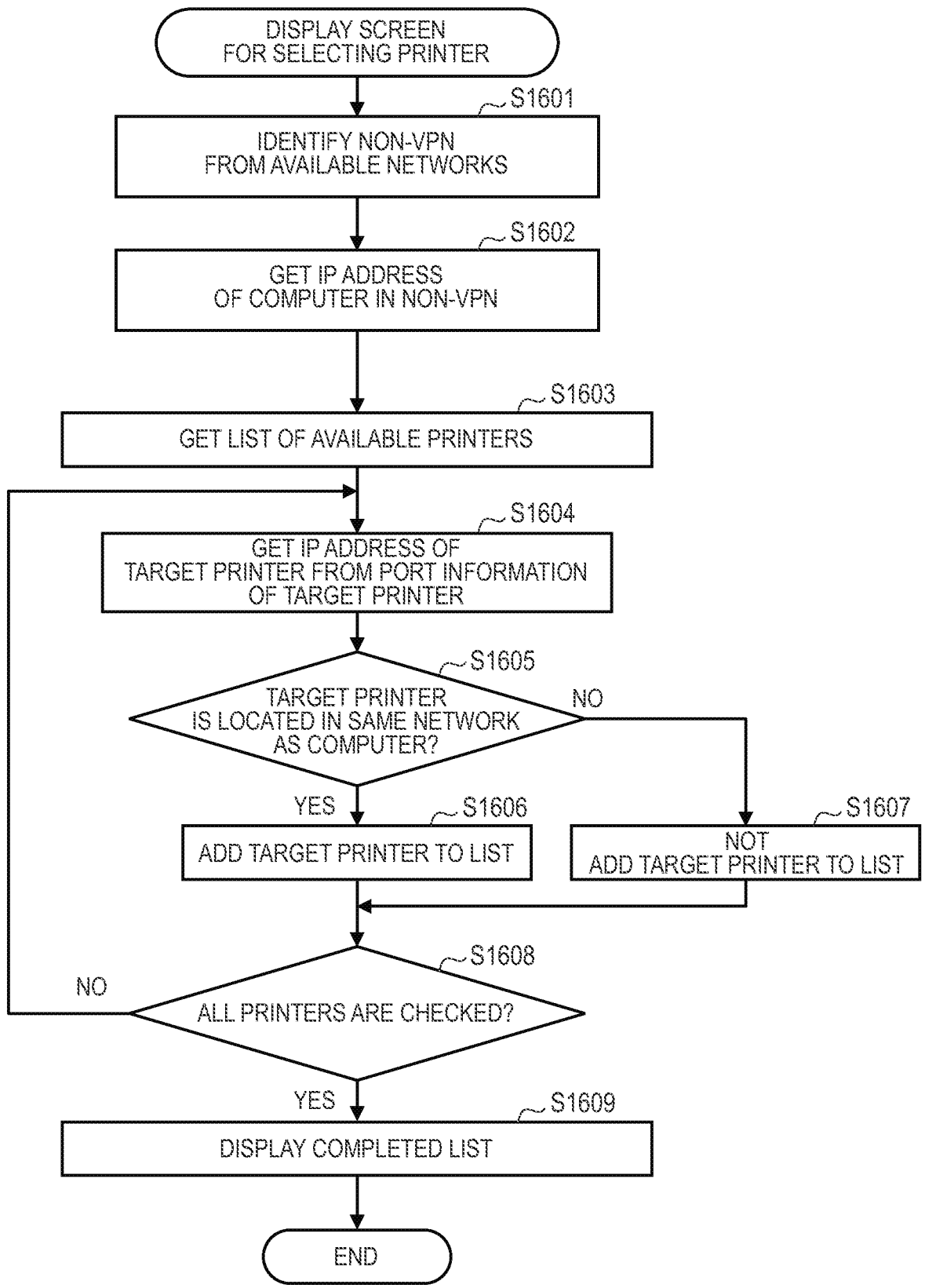
FIG. 16 is a flowchart of the process of determining options of printers according to the sixth embodiment.

FIG. 16 is a flowchart showing an example of processing for determining the options of the printer according to the sixth embodiment. As in the first embodiment, this processing may be performed by the application 1100 or by the OS 1200, but it will be described here as being performed by the application 1100. Here, the flow will be described in case that the check box 1700 in FIG. 6 is checked (activated). The processing described here is realized by the CPU 1041 loading the application 1100 stored in the storage unit 1030 into the memory 1042 and executing the application 1100.

The application 1100 first determines networks which are not a virtual private network (non-VPN) among the networks available to the computer 1000 (step S1601). This processing is same as the processing of step S1331 in the third embodiment. In the configuration of the present embodiment, only the home network 5000 is determined to be a non-VPN.

Next, the application 1100 acquires the IP address of the computer 1000 in the non-VPN determined in step S1601 (step S1602). This processing is the same as the processing of step S1332 in the third embodiment. In the present embodiment, the IP address acquired in step S1332 is "192.168.1.50" in the home network 5000.

Since the processes of steps S1603 to S1609 are same as the processes of steps S1312 to S1318 of FIG. 3, the descriptions thereof will be omitted.

As described above, even if the address of the same segment as the company network is assigned as the IP address of the computer 1000 in the virtual private network (VPN) 7000, only the printers that are installed in the location that is the same as the user's location are listed.

For example, in case of bridge-connecting to the company network 6000 from home, an address of the same segment as the company network (172.26.176.0) is assigned as an IP address of the computer 1000 in the virtual private network 7000. In this case, according to the method of the first embodiment, the networks to which the computer 1000 belongs correspond to "192.168.1.0" and "172.26.176.0". Therefore, it is determined that the printer B3000 (172.26.178.127/21) is in the same network as the computer 1000. On the other hand, according to the method of the sixth embodiment, the network to which the computer 1000 belongs corresponds only to "192.168.1.0". Thus, it is determined that the printer B3000 (172.26.178.127/21) is not in the same network as the computer 1000 (No in step S1605). Therefore, the application 1100 does not add the "printer B" to the display list (step S1607).

According to the sixth embodiment, in the case of connecting to the company network from home and in the case that the address of the same segment as the company network is assigned as the IP address of the home computer in the virtual private network, only the printer installed in the home is listed. If the check box 1700 of FIG. 6 is not checked (is deactivated) when printing at home, the user interface shown in FIG. 5A is displayed. If the check box 1700 in FIG. 6 is checked (is activated), the user interface shown in FIG. 5B is displayed. Thus, even if the bridge connection or the like is made to the company network, the risk of selecting the company printer when performing a printing operation at home or selecting the home printer when performing a printing operation at the company can be avoided. As a result, it becomes possible to suppress an error (if not connected to the VPN) and also to suppress the risk of leaking information due to the printout operation using the printer installed in the company (if connected to the VPN) when a printing operation is performed by mistakenly selecting the printer installed in the company while working at home, thereby improving usability when performing a printing operation.

Seventh Embodiment

One form of home teleworking is to connect a home computer to a company computer via a VPN to remotely operate the company computer using the home computer for teleworking. For example, a user may use "Remote Desktop" of Windows® or the like from a home computer to connect the home computer to a company computer through a VPN. In such a situation, if a printer installed in the company is selected by mistake while working at home and a printing operation is performed, the printer installed in the company outputs data but the user cannot collect the output data, which cause a risk of leaking information. That is, there is a similar problem in the above situation as well as the previously described embodiments.

Figure 17:
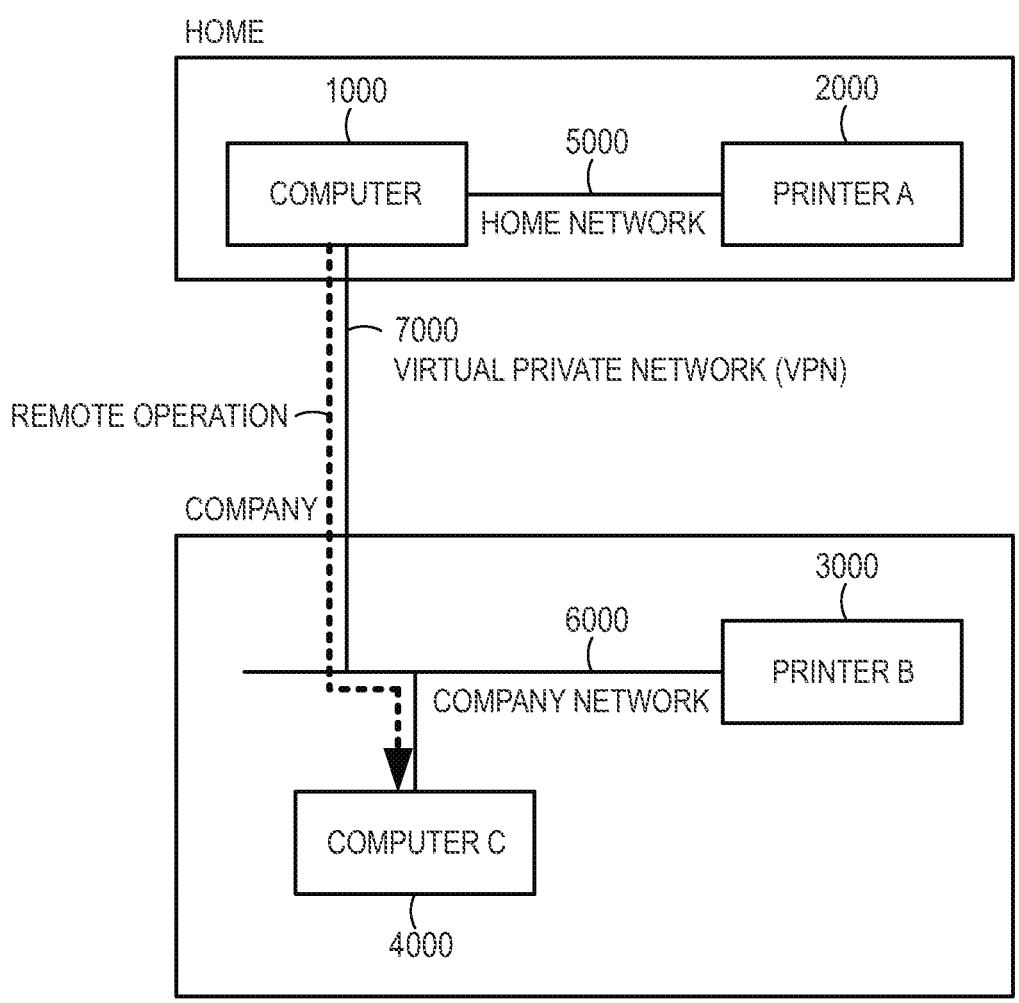
FIG. 17 shows an example of a network configuration according to the seventh embodiment.

FIG. 17 is a diagram showing an example of a network configuration including an information processing apparatus according to the seventh embodiment of the present disclosure. The same reference numerals as those in FIG. 1 are assigned to the same components.

In the company, there is a computer C4000 connected to the company network 6000. The hardware configuration of the computer C4000 is same as the configuration of the computer 1000 shown in FIG. 2. The software configuration of the computer C4000 includes a remote host function in addition to the software configuration of the computer 1000 shown in FIG. 3. The remote host function can provide an operation environment (desktop environment) to operate the computer C4000 through other devices that can communicate via a network, and enables remote operation through the other devices. The remote host function corresponds to, for example, the "Remote Desktop" host function of Windows.

On the other hand, the home computer 1000 has a remote client function (e.g., "Remote Desktop" client function of Windows) for connecting to the remote host function via a network.

Next, the procedure for determining a list of printers (printer list) will be described with reference to the flowchart of FIG. 18.

Figure 18:
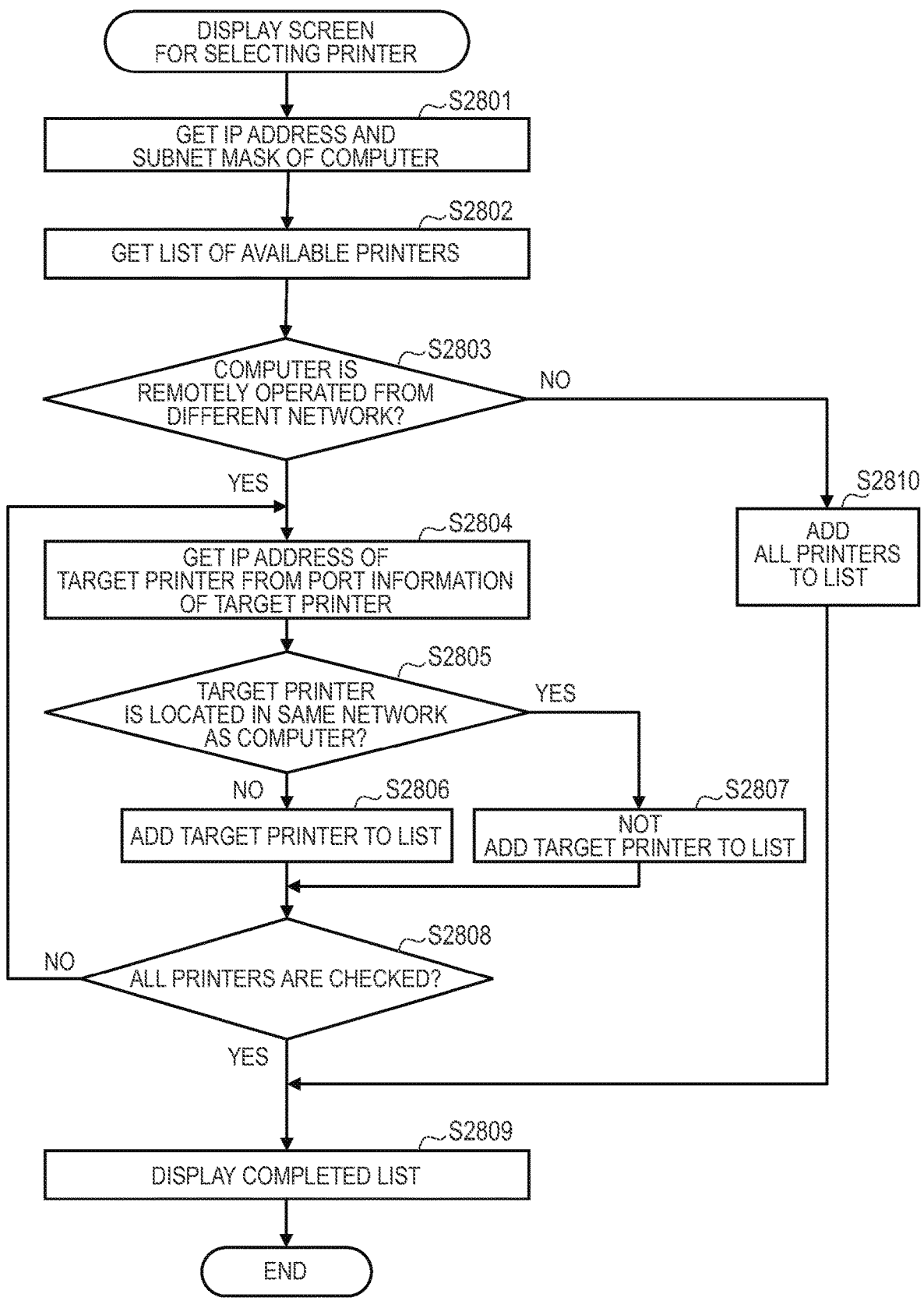
FIG. 18 is a flowchart of the process of determining options of printers according to the seventh embodiment.

FIG. 18 is a flowchart showing an example of processing for determining options of the printer according to the seventh embodiment. This processing may be performed by the application of the computer C4000 or by the OS, but will be described here as being performed by the application. All of the processing described here is realized by the CPU loading an application stored in the storage unit of the computer C4000 into the memory and executing the application.

The application of the computer C4000 (hereinafter simply referred to as "application") first acquires the IP address and subnet mask of the computer C4000 (step S2801). This processing is the same as the process of step S1311 in the first embodiment.

Next, the application obtains a list of available printers (step S2802).

This processing is the same as the process of step S1312 in the first embodiment.

Next, the application checks whether a connection is made to the remote host function of the computer C4000 from a device belonging to a network different from the network to which the computer C4000 is connected (step S2803). If there is no such connection to the remote host function (No in step S2803), the application adds all the printers acquired in step S2802 to the display list (step S2810), and advances the process to step S2809.

On the other hand, if there is a connection to the remote host function (Yes in step S2803), the application advances the process to step S2804.

In step S2804, the application sets the printer A2000 as a first target printer, and acquires the IP address of the target printer from the port information of the printer. This process is same as the processing of step S1313 in the first embodiment. Although not described in the flowchart, if the printer is not connected to a network as in "Print to PDF", the application adds that printer to the display list in step S2806, which will be described later.

Next, the application checks whether the computer 1000 and the target printer are in the same network (step S2805). This process is same as the process of step S1314 in the first embodiment. If it is confirmed that the target printer is in the same network (Yes in step S2805), the application does not add the target printer to the display list (step S2807), and advances the process to step S2808.

If it is confirmed that the computer 1000 and the target printer are not in the same network (No in step S2805), the application adds the target printer to the display list (step S2806) and advances the process to step S2808.

For example, the network to which the printer B belongs corresponds to an address "172.26.176.0" and the network to which the computer C4000 belongs also corresponds to the address "172.26.176.0". In this case, it is determined that the printer B3000 and the computer C4000 are in the same network (Yes in step S2805). Therefore, the application does not add the "printer B" to the display list (step S2807). Since "Print to PDF" is not associated with a network connection, the application adds "Print to PDF" to the display list as described above (step S2806).

In step S2808, the application determines whether or not the checking process about the connection to the same network as the computer has been done for all printers (steps S2804 to S2807). If there is a printer that has not been checked yet (No in step S2808), the application performs a controlling process to perform the processes of steps S2804 to S2807 for the printer that has not been checked yet.

On the other hand, if the checking process has been done for all the printers (Yes in step S2808), the application 1100 advances the process to step S2809.

In step S2809, the application 1100 displays the list completed by the above-described processes and ends the processing of this flowchart.

As described above, the computer C4000 does not display a printer belonging to the same network as the computer C4000 in the printer list if the connection to the remote host function from a device (e.g., the computer 1000) belongs to a network different from the computer C4000. Thus, even if the user remotely operating the computer of the company at home mistakenly selects a printer installed in the company to print out data, causing the risk of leaking information can be suppressed, which improves the usability when performing a printing operation.

In this configuration, a check box for selecting whether or not to use printers on the remote host side (printers installed in the company) may be provided in a user interface of the remote client side to control displaying or not displaying the printers.

Figure 19:
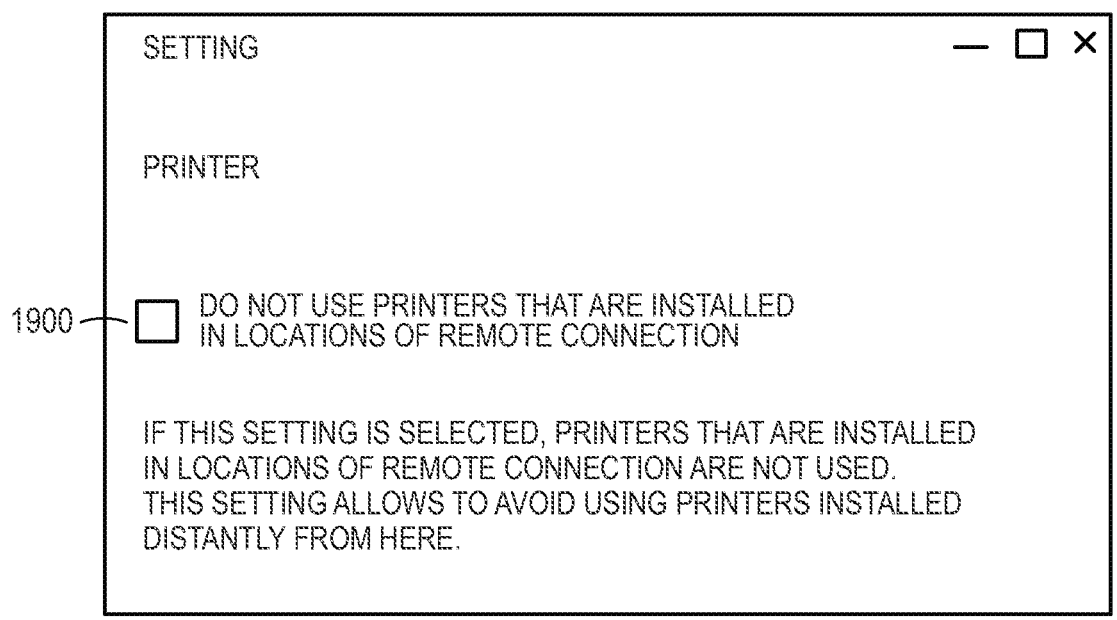
FIG. 19 shows a configuration screen for excluding unintended printers from options.

FIG. 19 is a diagram showing an example of a user interface for excluding printers that the user does not intend to use from options of the printer list. In other words, this setting is made for not using printers that are not installed in the current location (the location where the computer 1000 is installed). This user interface is displayed by the application having the remote client function installed in the home computer 1000. The configuration may be displayed by the OS.

This user interface can be operated by a user when remotely connecting from the home computer 1000 to the company computer C4000.

Checking a check box 1900 and then remotely connecting from the computer 1000 to the computer C4000 allows the user to establish the remote connection with this setting enabled. If the computer C4000 is remotely connected to the computer 1000 in response to a request of remote connection including information indicating the activation of this setting, the computer C4000 excludes the printer B3000 present in the company network 6000 from the printer list used for selecting a printer when performing a printing operation. On the other hand, if the computer C4000 is remotely connected to the computer 1000 in response to a request of remote connection that does not include information indicating the activation of this setting, the computer C4000 displays all printers registered in the computer C4000 as selectable printers.

That is, if the remote connection is made with the check box 1900 of FIG. 19 checked (activated), the processing shown in the flowchart of FIG. 18 is executed.

As shown above, printers installed in the remote destination network are excluded from the list at the timing of performing a printing operation. More specifically, if the remote connection from the home computer to the company computer is established with the check box 1900 of FIG. 19 being not checked (deactivated), a UI screen as shown in FIG. 5A displayed by the remotely operated computer C4000 is shown to the user. On the other hand, if the remote connection from the home computer to the company computer is established with the check box 1900 shown in FIG. 19 being checked (activated), a UI screen as shown in FIG. 5B displayed by the remotely operated computer C4000 is shown to the user. Providing such a screen of the printer list to the computer 1000 of the user who is remotely operating the computer C4000 at home allows the avoiding of the risk of selecting the printer installed in the company when performing a printing operation at home. As a result, it becomes possible to suppress causing the risk of leaking information, which could occur if a company printer is mistakenly selected for a printing operation when working at home and data is output from the company printer (in case of connecting to a VPN).

In the seventh embodiment, the user may enable a setting (not shown) for not using a printer on the client side (a printer on the home network 5000) and establish a remote connection from the computer 1000 to the computer C4000. In response to establishing a remote connection to the computer 1000 based on a request for the remote connection including information indicating the activation of this setting, the computer C4000 excludes the printer A2000 present in the home network 5000 from the printer list used for selecting a printer when performing a printing operation. On the other hand, if the remote connection is made to the computer 1000 in response to a request of the remote connection including information indicating the deactivation of the setting, the computer C4000 includes the printer A2000 present in the home network 5000 in the printer list. The seventh embodiment may include the configuration shown above.

As described above, according to the respective embodiments, in a case that a user brings a company PC home, the user does not have to search a printer installed at home because printers which are not installed in the current location of the user cannot be selected in advance. In addition, according to the respective embodiments, the risk of having an error or leaking information due to mistakenly printing out data from a printer installed in a company (i.e., a printer located distant from the user) can be prevented.

For example, in case of bring a company PC to use at home, the risk of accidentally selecting a printer that the user does not intend to use such as a company printer can be suppressed, and the usability when a user selects a printer to be used for printing from a printer list can be improved.

The present disclosure has described multiple embodiments. Note that the API and commands shown here are only examples, and may be implemented by using other similar means. Further, although a printer has been described as an example of a peripheral device, a peripheral device other than the printer can be similarly implemented. Further, although the processing for excluding unnecessary options has been described in all the embodiments, the same effect can be obtained by moving the unnecessary options to the latter half of the list for the purpose of lowering the priority instead of excluding the unnecessary options. In addition, the options having a lower priority may be marked. If the peripheral device is a shared object via a server, the IP address of the server may be used as a connection destination address instead of the IP address of the peripheral device, and the same processing may be performed. According to the above process, the same effect can be obtained in an environment having a shared printer via a print server.

The structure and contents of the various data described above are not limited to the above descriptions, and the various data may have various structures and contents depending on the use and purpose.

Although some embodiments have been described above, some embodiments may be implemented as, for example, a system, apparatus, method, program, storage medium, or the like. Specifically, some embodiments may be applied to a system comprising multiple apparatuses, or may be applied to a device comprising a single apparatus.

In addition, all of the configurations formed by combining the above embodiments are also included in the scope of the present disclosure.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-183249, which was filed on Nov. 10, 2021, and Japanese Patent Application No. 2022-142195, which was filed on Sep. 7, 2022, both of which are hereby incorporated by reference herein in their entireties.

What is claimed is:

1. An information processing apparatus that is connected to a local network by using a first address and is able to be connected to another network by using a second address for a remote access function, the information processing apparatus comprising:
- a storage device configured to store a print queue for transmitting print data to a printer;
- one or more memories; and
- one or more processors that are configured to cooperate with the one or more memories to control the information processing apparatus to:
- determine, in a predetermined situation, whether the printer corresponding to the print queue is a printer that is connected to said another network, which the information processing apparatus accesses by using the second address, wherein in the predetermined situation the remote access function for connecting the information processing apparatus to said another network is operating; and
- cause a display to display the print queue as a candidate of a destination of print data in a case that it is determined that the printer is not the printer that is connected to said another network, wherein the print queue is not displayed as the candidate of the destination of the print data in a case that it is determined that the printer is the printer that is connected to said another network.

2. The information processing apparatus according to claim 1,
wherein the second address is an address for a virtual private network.

3. The information processing apparatus according to claim 1,
wherein in the case that it is determined that the printer is not the printer that is connected to said another network, the printer is connected to the information processing apparatus via the local network that is different from said another network.

4. The information processing apparatus according to claim 1, wherein the remote access function is enabled based on a user instruction.

5. The information processing apparatus according to claim 1,
wherein the determination is executed based on one or more IP addresses set to the information processing apparatus and an IP address set to the printer.

6. The information processing apparatus according to claim 5,
wherein the one or more processors are further configured to cooperate with the one or more memories to determine whether the printer corresponding to the print queue is connected to the information processing apparatus via said another network based on the IP address set to the printer and on a subnet mask of said another network.

7. The information processing apparatus according to claim 1,
wherein the information processing apparatus has a network address on a second network that is different from said another network, wherein the second network is a local network,
wherein the printer has a network address, and
wherein, to determine whether the printer corresponding to the print queue is connected to the information processing apparatus via said another network, the one or more processors are further configured to cooperate with the one or more memories to control the information processing apparatus to determine whether the printer is in the local network based on the network address on the local network and on the network address of the printer.

8. A method for controlling an information processing apparatus that is connected to a local network by using a first address and is able to be connected to another network by using a second address for a remote access function and that stores a print queue for transmitting print data to a printer, the method comprising:
- determining, in a predetermined situation, whether the printer corresponding to the print queue is a printer that is connected to said another network, wherein in the predetermined situation the remote access function that connects the information processing apparatus to said another network is operating; and
- causing a display to display the print queue as a candidate of a destination of print data in a case that it is determined that the printer is not the printer that is connected to said another network, wherein the print queue is not displayed as the candidate of the destination of the print data in a case that it is determined that the printer is the printer that is connected to said another network.

9. The method according to claim 8, wherein the remote access function is a function for connecting the information processing apparatus to said another network by using a virtual private network.

10. The method according to claim 8,
wherein the remote access function is enabled based on a user instruction.

11. The method according to claim 10, wherein the determination is executed based on one or more IP addresses set to the information processing apparatus and an IP address set to the printer.

12. The method according to claim 8, the method further comprising:
transmitting a predetermined command to the printer corresponding to the print queue by using the first address, wherein the determining is executed based on a response to the transmitted command.

13. The method according to claim 8, the method further comprising:
transmitting a predetermined command to the printer corresponding to the print queue by using the second address, wherein the determining is executed based on a response to the transmitted command.

14. The method according to claim 8, wherein the information processing apparatus stores another print queue for outputting a file and said another print queue is displayed as the candidate of the destination of the print data whether or not the remote access function is enabled.

15. A non-transitory computer-readable storage medium storing computer-executable instructions that cause an information processing apparatus to execute a method for controlling the information processing apparatus that is connected to a local network by using a first address and is able to be connected to another network by using a second address for a remote access function and that stores a print queue for transmitting print data to a printer, the method comprising:
- determining, in a predetermined situation, whether the printer corresponding to the print queue is a printer that is connected to said another network, wherein in the predetermined situation the remote access function that connects the information processing apparatus to said another network is operating; and causing a display to display the print queue as a candidate of a destination of print data in a case that it is determined that the printer is not the printer that is connected to said another network, wherein the print queue is not displayed as the candidate of the destination of the print data in a case that it is determined that the printer is the printer that is connected to said another network.

16. The non-transitory computer-readable storage medium according to claim 15, wherein the remote access function is a function for connecting the information processing apparatus to said another network by using a virtual private network.

17. The non-transitory computer-readable storage medium according to claim 16, wherein the information processing apparatus is connected to the local network by using the first address different from the second address.

18. The non-transitory computer-readable storage medium according to claim 15, wherein the determination is executed based on one or more IP addresses set to the information processing apparatus and an IP address set to the printer.

19. The non-transitory computer-readable storage medium according to claim 15, the method further comprising:
transmitting a predetermined command to the printer corresponding to the print queue by using the first address, wherein the determining is executed based on a response to the transmitted command.

20. The non-transitory computer-readable storage medium according to claim 15, the method further comprising:
transmitting a predetermined command to the printer corresponding to the print queue by using the second address, wherein the determining is executed based on a response to the transmitted command.

21. The non-transitory computer-readable storage medium according to claim 15, wherein the information processing apparatus stores another print queue for outputting a file and said another print queue is displayed as the candidate of the destination of the print data whether or not the remote access function is enabled.

* * * * *